(12) United States Patent
Karandikar et al.

(10) Patent No.: US 9,111,368 B1
(45) Date of Patent: Aug. 18, 2015

(54) PIPELINED L2 CACHE FOR MEMORY TRANSFERS FOR A VIDEO PROCESSOR

(75) Inventors: Ashish Karandikar, Sunnyvale, CA (US); Shirish Gadre, Fremont, CA (US); Franciscus W. Sijstermans, Los Altos, CA (US); Zhiqiang Jonathan Su, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 482 days.

(21) Appl. No.: 11/267,606

(22) Filed: Nov. 4, 2005

Related U.S. Application Data

(60) Provisional application No. 60/628,414, filed on Nov. 15, 2004.

(51) Int. Cl.
  *G09G 5/36* (2006.01)
  *G06T 1/60* (2006.01)
  *G06F 12/08* (2006.01)

(52) U.S. Cl.
  CPC .............. *G06T 1/60* (2013.01); *G06F 12/0877* (2013.01)

(58) Field of Classification Search
  USPC ......... 345/506, 522, 531, 537, 538, 547, 557, 345/558; 711/118–146
  See application file for complete search history.

(56) References Cited

U.S. PATENT DOCUMENTS

| | | | |
|---|---|---|---|
| 3,091,657 A | 5/1963 | Stuessel | |
| 3,614,710 A | 10/1971 | Glickmann | |
| 3,614,740 A | 10/1971 | Delagi et al. | |
| 3,987,291 A | 10/1976 | Gooding et al. | |
| 4,101,960 A | 7/1978 | Stokes et al. | |
| 4,541,046 A | 9/1985 | Nagashima et al. | |
| 4,566,005 A | 1/1986 | Apperley et al. | |
| 4,748,585 A | 5/1988 | Chiarulli et al. | |
| 4,897,717 A | 1/1990 | Hamilton et al. | |
| 4,897,779 A | 1/1990 | Dickson et al. | |
| 4,958,303 A | 9/1990 | Assarpour et al. | |
| 4,965,716 A | 10/1990 | Sweeney | |
| 4,965,751 A | 10/1990 | Thayer et al. | |
| 4,985,848 A | 1/1991 | Pfeiffer et al. | |
| 5,040,109 A | 8/1991 | Bowhill et al. | |
| 5,047,975 A | 9/1991 | Patti et al. | |
| 5,175,828 A | 12/1992 | Hall et al. | |

(Continued)

FOREIGN PATENT DOCUMENTS

| | | |
|---|---|---|
| DE | 29606102 | 6/1996 |
| JP | 07-101885 | 4/1995 |

(Continued)

OTHER PUBLICATIONS

SearchStorage.com Definitions, "Pipeline burst cache", Jul. 31, 2001, url: http://searchstorage.techtarget.com/sDefinition/0,,sid5_gci214414,00.html.*

(Continued)

*Primary Examiner* — David H Chu

(57) ABSTRACT

A method for using a pipelined L2 cache to implement memory transfers for a video processor. The method includes accessing a queue of read requests from a video processor. For each of the read requests, a determination is made as to whether there is a cache line hit corresponding to the request. For each cache line miss, a cache line slot is allocated to store a new cache line responsive to the cache line miss. An in-order set of cache lines is output to the video processor responsive to the queue of read requests.

23 Claims, 14 Drawing Sheets

(56) References Cited

U.S. PATENT DOCUMENTS

| | | | | |
|---|---|---|---|---|
| 5,179,530 | A | 1/1993 | Genusov et al. | |
| 5,197,130 | A | 3/1993 | Chen et al. | |
| 5,210,834 | A | 5/1993 | Zurawski et al. | |
| 5,263,136 | A | 11/1993 | DeAguiar et al. | |
| 5,327,369 | A | 7/1994 | Ashkenazi | |
| 5,357,623 | A | 10/1994 | Megory-Cohen | |
| 5,375,223 | A * | 12/1994 | Meyers et al. | 711/151 |
| 5,388,206 | A * | 2/1995 | Poulton et al. | 345/505 |
| 5,388,245 | A | 2/1995 | Wong | 711/118 |
| 5,418,973 | A * | 5/1995 | Ellis et al. | 712/3 |
| 5,430,841 | A | 7/1995 | Tannenbaum et al. | |
| 5,430,884 | A | 7/1995 | Beard et al. | |
| 5,432,905 | A * | 7/1995 | Hsieh et al. | 345/99 |
| 5,517,666 | A | 5/1996 | Ohtani et al. | |
| 5,522,080 | A | 5/1996 | Harvey | |
| 5,560,030 | A * | 9/1996 | Guttag et al. | 712/16 |
| 5,561,808 | A | 10/1996 | Kuma et al. | |
| 5,574,944 | A | 11/1996 | Stager | |
| 5,627,988 | A * | 5/1997 | Oldfield | 711/101 |
| 5,644,753 | A | 7/1997 | Ebrahim et al. | |
| 5,649,173 | A * | 7/1997 | Lentz | 345/501 |
| 5,666,169 | A | 9/1997 | Ohki et al. | |
| 5,682,554 | A | 10/1997 | Harrell | |
| 5,706,478 | A | 1/1998 | Dye | |
| 5,754,191 | A * | 5/1998 | Mills et al. | 345/563 |
| 5,761,476 | A | 6/1998 | Martell | |
| 5,764,243 | A | 6/1998 | Baldwin | |
| 5,784,590 | A * | 7/1998 | Cohen et al. | 711/122 |
| 5,784,640 | A | 7/1998 | Asghar et al. | |
| 5,796,974 | A | 8/1998 | Goddard et al. | |
| 5,802,574 | A | 9/1998 | Atallah et al. | |
| 5,809,524 | A * | 9/1998 | Singh et al. | 711/118 |
| 5,812,147 | A | 9/1998 | Van Hook et al. | |
| 5,835,788 | A | 11/1998 | Blumer et al. | |
| 5,848,254 | A | 12/1998 | Hagersten | |
| 5,920,352 | A * | 7/1999 | Inoue | 348/384.1 |
| 5,925,124 | A | 7/1999 | Hilgendorf et al. | |
| 5,940,090 | A * | 8/1999 | Wilde | 345/557 |
| 5,940,858 | A | 8/1999 | Green | |
| 5,949,410 | A | 9/1999 | Fung | |
| 5,950,012 | A | 9/1999 | Shiell et al. | |
| 5,978,838 | A | 11/1999 | Mohamed et al. | |
| 5,999,199 | A | 12/1999 | Larson | |
| 6,009,454 | A | 12/1999 | Dummermuth | |
| 6,016,474 | A | 1/2000 | Kim et al. | |
| 6,041,399 | A | 3/2000 | Terada et al. | |
| 6,049,672 | A | 4/2000 | Shiell et al. | |
| 6,073,158 | A | 6/2000 | Nally et al. | |
| 6,092,094 | A | 7/2000 | Ireton | |
| 6,108,766 | A | 8/2000 | Hahn et al. | |
| 6,112,019 | A | 8/2000 | Chamdani et al. | |
| 6,131,152 | A * | 10/2000 | Ang et al. | 712/24 |
| 6,141,740 | A | 10/2000 | Mahalingaiah et al. | |
| 6,144,392 | A * | 11/2000 | Rogers | 345/537 |
| 6,150,610 | A | 11/2000 | Sutton | |
| 6,189,068 | B1 | 2/2001 | Witt et al. | |
| 6,192,073 | B1 | 2/2001 | Reader et al. | |
| 6,192,458 | B1 * | 2/2001 | Arimilli et al. | 711/220 |
| 6,209,078 | B1 | 3/2001 | Chiang et al. | |
| 6,222,552 | B1 * | 4/2001 | Haas et al. | 345/422 |
| 6,230,254 | B1 | 5/2001 | Senter et al. | |
| 6,239,810 | B1 | 5/2001 | Van Hook et al. | |
| 6,247,094 | B1 * | 6/2001 | Kumar et al. | 711/3 |
| 6,252,610 | B1 | 6/2001 | Hussain | |
| 6,292,886 | B1 | 9/2001 | Makineni et al. | |
| 6,301,600 | B1 | 10/2001 | Petro et al. | |
| 6,314,493 | B1 | 11/2001 | Luick | |
| 6,317,819 | B1 | 11/2001 | Morton | |
| 6,351,808 | B1 * | 2/2002 | Joy et al. | 712/228 |
| 6,370,617 | B1 | 4/2002 | Lu et al. | |
| 6,437,789 | B1 | 8/2002 | Tidwell et al. | |
| 6,438,664 | B1 | 8/2002 | McGrath et al. | |
| 6,480,927 | B1 | 11/2002 | Bauman | |
| 6,490,654 | B2 | 12/2002 | Wickeraad et al. | |
| 6,496,902 | B1 | 12/2002 | Faanes et al. | |
| 6,499,090 | B1 | 12/2002 | Hill et al. | |
| 6,525,737 | B1 | 2/2003 | Duluk, Jr. et al. | |
| 6,529,201 | B1 * | 3/2003 | Ault et al. | 345/582 |
| 6,597,357 | B1 | 7/2003 | Thomas | |
| 6,603,481 | B1 | 8/2003 | Kawai et al. | |
| 6,624,818 | B1 | 9/2003 | Mantor et al. | |
| 6,631,423 | B1 | 10/2003 | Brown et al. | |
| 6,631,463 | B1 | 10/2003 | Floyd et al. | |
| 6,657,635 | B1 | 12/2003 | Hutchins et al. | |
| 6,658,447 | B2 | 12/2003 | Cota-Robles | |
| 6,674,841 | B1 | 1/2004 | Johns et al. | |
| 6,700,588 | B1 | 3/2004 | MacInnis et al. | |
| 6,715,035 | B1 * | 3/2004 | Colglazier et al. | 711/118 |
| 6,732,242 | B2 | 5/2004 | Hill et al. | |
| 6,809,732 | B2 | 10/2004 | Zatz et al. | |
| 6,812,929 | B2 * | 11/2004 | Lavelle et al. | 345/535 |
| 6,825,843 | B2 | 11/2004 | Allen et al. | |
| 6,825,848 | B1 | 11/2004 | Fu et al. | |
| 6,839,062 | B2 | 1/2005 | Aronson et al. | |
| 6,862,027 | B2 | 3/2005 | Andrews et al. | |
| 6,891,543 | B2 | 5/2005 | Wyatt | |
| 6,915,385 | B1 | 7/2005 | Leasure et al. | |
| 6,944,744 | B2 | 9/2005 | Ahmed et al. | |
| 6,952,214 | B2 | 10/2005 | Naegle et al. | |
| 6,965,982 | B2 | 11/2005 | Nemawarkar | |
| 6,975,324 | B1 * | 12/2005 | Valmiki et al. | 345/555 |
| 6,976,126 | B2 * | 12/2005 | Clegg et al. | 711/128 |
| 6,978,149 | B1 | 12/2005 | Morelli et al. | |
| 6,978,457 | B1 | 12/2005 | Johl et al. | |
| 6,981,106 | B1 * | 12/2005 | Bauman et al. | 711/146 |
| 6,985,151 | B1 | 1/2006 | Bastos et al. | |
| 7,015,909 | B1 | 3/2006 | Morgan III et al. | |
| 7,031,330 | B1 * | 4/2006 | Bianchini, Jr. | 370/412 |
| 7,032,097 | B2 | 4/2006 | Alexander et al. | |
| 7,035,979 | B2 | 4/2006 | Azevedo et al. | |
| 7,148,888 | B2 | 12/2006 | Huang | |
| 7,151,544 | B2 * | 12/2006 | Emberling | 345/582 |
| 7,154,500 | B2 | 12/2006 | Heng et al. | |
| 7,159,212 | B2 | 1/2007 | Schenk et al. | |
| 7,185,178 | B1 | 2/2007 | Barreh et al. | |
| 7,202,872 | B2 | 4/2007 | Paltashev et al. | |
| 7,260,677 | B1 | 8/2007 | Vartti et al. | |
| 7,305,540 | B1 | 12/2007 | Trivedi et al. | |
| 7,321,787 | B2 | 1/2008 | Kim | |
| 7,334,110 | B1 | 2/2008 | Faanes et al. | |
| 7,369,815 | B2 | 5/2008 | Kang et al. | |
| 7,373,478 | B2 | 5/2008 | Yamazaki | |
| 7,406,698 | B2 | 7/2008 | Richardson | |
| 7,412,570 | B2 | 8/2008 | Moll et al. | |
| 7,486,290 | B1 | 2/2009 | Kilgariff et al. | |
| 7,487,305 | B2 | 2/2009 | Hill et al. | |
| 7,493,452 | B2 | 2/2009 | Eichenberger et al. | |
| 7,545,381 | B2 | 6/2009 | Huang et al. | |
| 7,564,460 | B2 | 7/2009 | Boland et al. | |
| 7,750,913 | B1 | 7/2010 | Parenteau et al. | |
| 7,777,748 | B2 * | 8/2010 | Bakalash et al. | 345/505 |
| 7,852,341 | B2 | 12/2010 | Rouet et al. | |
| 7,869,835 | B1 | 1/2011 | Zu | |
| 8,020,169 | B2 | 9/2011 | Yamasaki | |
| 2001/0026647 | A1 * | 10/2001 | Morita | 382/299 |
| 2002/0116595 | A1 | 8/2002 | Morton | |
| 2002/0130874 | A1 | 9/2002 | Baldwin | |
| 2002/0144061 | A1 | 10/2002 | Faanes et al. | |
| 2002/0194430 | A1 * | 12/2002 | Cho | 711/118 |
| 2003/0001847 | A1 | 1/2003 | Doyle et al. | |
| 2003/0003943 | A1 | 1/2003 | Bajikar | |
| 2003/0014457 | A1 | 1/2003 | Desai et al. | |
| 2003/0016217 | A1 | 1/2003 | Vlachos et al. | |
| 2003/0016844 | A1 * | 1/2003 | Numaoka | 382/100 |
| 2003/0031258 | A1 | 2/2003 | Wang et al. | |
| 2003/0067473 | A1 | 4/2003 | Taylor et al. | |
| 2003/0172326 | A1 | 9/2003 | Coffin, III et al. | |
| 2003/0188118 | A1 | 10/2003 | Jackson | |
| 2003/0204673 | A1 | 10/2003 | Venkumahanti et al. | |
| 2003/0204680 | A1 * | 10/2003 | Hardage, Jr. | 711/146 |
| 2003/0227461 | A1 | 12/2003 | Hux et al. | |
| 2004/0012597 | A1 | 1/2004 | Zatz et al. | |
| 2004/0073771 | A1 | 4/2004 | Chen et al. | |
| 2004/0073773 | A1 | 4/2004 | Demjanenko | |

(56) References Cited

U.S. PATENT DOCUMENTS

| | | | |
|---|---|---|---|
| 2004/0103253 A1 | 5/2004 | Kamei et al. | |
| 2004/0193837 A1 | 9/2004 | Devaney et al. | |
| 2004/0205326 A1 | 10/2004 | Sindagi et al. | |
| 2004/0212730 A1 | 10/2004 | MacInnis et al. | |
| 2004/0215887 A1 | 10/2004 | Starke | |
| 2004/0221117 A1* | 11/2004 | Shelor | 711/163 |
| 2004/0263519 A1* | 12/2004 | Andrews et al. | 345/502 |
| 2005/0012759 A1 | 1/2005 | Valmiki et al. | |
| 2005/0024369 A1 | 2/2005 | Xie | |
| 2005/0071722 A1* | 3/2005 | Biles | 714/746 |
| 2005/0088448 A1* | 4/2005 | Hussain et al. | 345/545 |
| 2005/0239518 A1 | 10/2005 | D'Agostino et al. | |
| 2005/0262332 A1* | 11/2005 | Rappoport et al. | 712/239 |
| 2005/0280652 A1 | 12/2005 | Hutchins et al. | |
| 2006/0020843 A1 | 1/2006 | Frodsham et al. | |
| 2006/0064517 A1 | 3/2006 | Oliver | |
| 2006/0064547 A1 | 3/2006 | Kottapalli et al. | |
| 2006/0103659 A1 | 5/2006 | Karandikar et al. | |
| 2006/0152519 A1 | 7/2006 | Hutchins et al. | |
| 2006/0152520 A1 | 7/2006 | Gadre et al. | |
| 2006/0176308 A1 | 8/2006 | Karandikar et al. | |
| 2006/0176309 A1 | 8/2006 | Gadre et al. | |
| 2007/0076010 A1 | 4/2007 | Swamy et al. | |
| 2007/0130444 A1 | 6/2007 | Mitu et al. | |
| 2007/0285427 A1 | 12/2007 | Morein et al. | |
| 2008/0016327 A1 | 1/2008 | Menon et al. | |
| 2008/0278509 A1 | 11/2008 | Washizu et al. | |
| 2009/0235051 A1 | 9/2009 | Codrescu et al. | |
| 2012/0023149 A1 | 1/2012 | Kinsman et al. | |

FOREIGN PATENT DOCUMENTS

| | | |
|---|---|---|
| JP | H08-077347 | 3/1996 |
| JP | H08-153032 | 6/1996 |
| JP | 07-101885 | 11/1996 |
| JP | H08297605 | 11/1996 |
| JP | 09-287217 | 11/1997 |
| JP | H09-325759 | 12/1997 |
| JP | 09-287217 | 8/1998 |
| JP | H10222476 | 8/1998 |
| JP | 11-190447 | 7/1999 |
| JP | 2000-148695 | 5/2000 |
| JP | 11-190447 | 1/2001 |
| JP | 2001022638 | 1/2001 |
| JP | 2003-178294 | 6/2003 |
| JP | 2004-252990 | 9/2004 |
| KR | 1998-018215 | 8/2000 |
| TW | 413766 | 12/2000 |
| TW | 436710 | 5/2001 |
| TW | 442734 | 6/2001 |

OTHER PUBLICATIONS

Fisher, Joseph A., "Very Long Instruction Word Architecture and the ELI-512", ACM, 1993, pp. 140-150.
Dictionary of Computers, Information Processing & Technology, 2nd edition.
FOLDOC, definition of Pentium.
FOLDOC, definition of X86.
Graham, Susan L. et al., "Getting Up to Speed: The Future of Supercomputing", The National Academies Press, 2005, glossary.
Wikipedia, vector proc.
FOLDOC, vector proc.
Intel, Intel Architecture Software Developer's Manual, vol. 1: Basic Architecture 1997, p. 8-1.
Intel, Intel Architecture Software Developer's Manual, vol. 1: Basic Architecture 1999, p. 8-1.
Intel, Intel MMX Technology at a Glance.
Intel, Intel Pentium III Xeon Processor at 500 and 550Mhz, Feb. 1999.
Intel, Pentium Processor Family Developer's Manual.
Intel, Pentium Processor with MMX Technology at 233Mhz Performance Brief.
VLIW Architectures at the ELI-512.
Wikipedia, definition of scalar processor.
Wikipedia, SIMD entry.
Gadre, S., Patent Application Entitled "Separately Schedulable Condition Codes for a Video Processor", U.S. Appl. No. 11/267,793, filed Nov. 4, 2005.
Lew et al., Patent Application Entitled "A Programmable DMA Engine for Implementing Memory Transfers for a Video Processor", U.S. Appl. No. 11/267,777, filed Nov. 4, 2005.
Karandikar et al., Patent Application Entitled "Command Acceleration in a Video Processor", U.S. Appl. No. 11/267,640, filed Nov. 4, 2005.
Karandikar et al., Patent Application Entitled "A Configurable SIMD Engine in a Video Processor", U.S. Appl. No. 11/267,393, filed Nov. 4, 2005.
Karandikar et al., Patent Application Entitled "Context Switching on a Video Processor Having a Scalar Execution Unit and a Vector Execution Unit", U.S. Appl. No. 11/267,778, filed Nov. 4, 2005.
Lew et al., Patent Application Entitled "Multi-Context Execution on a Video Processor", U.S. Appl. No. 11/267,780, filed Nov. 4, 2005.
Su et al., Patent Application Entitled "State Machine Control for a Pipelined L2 Cache to Implement Memory Transfers for a Video Processor", U.S. Appl. No. 11/267,119, filed Nov. 4, 2005.
Free On-Line Dictionary of Computing (FOLDOC), defintion of "video", from foldoc.org/index.cgi?query=video&action=Search, May 23, 2008.
FOLDOC, definition of "frame buffer", from foldoc.org/index.cgi?query=frame+buffer&action=Search, Oct. 3, 1997.
PCreview, article entitled "What is a Motherboard", from www.pcreview.co.uk/articles/Hardware/What_is_a_Motherboard., Nov. 22, 2005.
FOLDOC, definition of "motherboard", from foldoc.org/index.cgi?query=motherboard&action=Search, Aug. 10, 2000.
FOLDOC, definition of "separate compilation", from foldoc.org/index.cgi?query=separate+compilation&action=Search, Feb. 19, 2005.
FOLDOC, definition of "vector processor", http://foldoc.org/, Sep. 11, 2003.
Wikipedia, defintion of "vector processor", http://en.wikipedia.org/, May 14, 2007.
Fisher, Joseph A., Very Long Instruction Word Architecture and the ELI-512, ACM, 1993, pp. 140-150.
FOLDOC (Free On-Line Dictionary of Computing), defintion of X86, Feb. 27, 2004.
FOLDOC, definition of superscalar.
FOLDHOC, definition of Pentium, Sep. 30, 2003.
Wikipedia, definition of "scalar processor".
Intel, Intel MMX Technology at a Glance, Jun. 1997.
Intel, Pentium Processor Family Developer's Manual, 1997, pp. 2-13.
Intel, Pentium processor with MMX Technology at 233Mhz Performance Brief, Jan. 1998, pp. 3 and 8.
Wikipedia, entry page defining term "SIMD", last modified Mar. 17, 2007.
Rosenberg, Jerry M., Dictionary of Computers, Information Processing & Telecommunications, Second Edition, John Wiley & Sons, 1987, pp. 305.
FOLDOC, Free Online Dictionary of Computing, defintion of SIMD, foldoc.org/index.cgi?query=simd&action=Search, Nov. 4, 1994.
Quinnell, Richard A. "New DSP Architectures Go "Post-Harvard" for Higher Performance and Flexibility" Techonline; posted May 1, 2002.
Wikipedia, definition of Multiplication, accessed from en.wikipedia.org/w/index.php?title=Multiplication&oldid=1890974, published Oct. 13, 2003.
Graf, Rudolf F., Modern Dictionary of Electronics, Howard W. Sams & Company, 1988, pp. 273.
IBM TDB, Device Queue Management, vol. 31 Iss. 10, pp. 45-50, Mar. 1, 1989.
Hamacher, V. Carl et al., Computer Organization, Second Edition, McGraw Hill, 1984, pp. 1-9.
Graham, Susan L. et al., Getting Up to Speed: The future of Supercomputing, the National Academies Press, 2005, glossary.

(56) References Cited

OTHER PUBLICATIONS

Rosenberg, Jerry M., Dictionary of Computers, Information Processing & Telecommunications, 2nd Edition, John Wiley & Sons, 1987, pp. 305.
Graf, Rudolf F., Modern Dictionary of Electronics, Howard W. Sams & Company, 1984, pp. 566.
Wikipeida, definition of "subroutine", published Nov. 29, 2003, four pages.
Rosenberg, Jerry M., Dictionary of Computers, Information Processing & Telecommunications, 2nd Edition, John Wiley & Sons, 1987, pp. 102 and 338.
Intel, Intel Architecture Software Deveopler's Manual, vol. 1: Basic Architecture 1999 p. 8-1, 9-1.
Definition of "queue" from Free on-Line Dictionary of Computing (FOLDOC), http://folddoc.org/index.cgi?query=queue&action=Search, May 15, 2007.
Definition of "first-in first-out" from FOLDHOC, http://foldoc.org/index.cgi?query=fifo&action=Search, Dec. 6, 1999.
Definition of "block" from FOLDHOC, http://foldoc.org/index.cgi?block, Sep. 23, 2004.
Graston et al. (Software Pipelining Irregular Loops on the TMS320C6000 VLIW DSP Architecture); Proceedings of the ACM SIGPLAN workshop on Languages, compilers and tools for embedded systems; pp. 138-144; Year of Publication: 2001.
Parhami, Behrooz, Computer Arithmetic: Algorithms and Hardware Designs, Oxford University Press, Jun. 2000, pp. 413-418.
gDEBugger, graphicRemedy, http://www.gremedy.com, Aug. 8, 2006.
Duca et al., A Relational Debugging Engine for Graphics Pipeline, International Conference on Computer Graphics and Interactive Techniques, ACM SIGGRAPH 2005, pp. 453-463, ISSN:0730-0301.
"Vertex Fog"; http://msdn.microsoft.com/library/en-us/directx9_c/Vertex_fog.asp?frame=true.
"Anti-aliasing"; http://en.wikipedia.org/wiki/Anti-aliasing.
"Alpha Testing State"; http://msdn.microsoft.com/library/en-us/directx9_c/directx/graphics/programmingguide/GettingStarted/Direct3Kdevices/States/renderstates/alphatestingstate.asp.
Brown, Brian; "Data Structure and Number Systems"; 2000; http://www.ibilce.unesp.br/courseware/datas/data3.htm.
Heirich; Optimal Automatic Mulit-pass Shader Partitioning by Dynamic Programming; Eurographics—Graphics Hardware (2005); Jul. 2005.
Hutchins E., SC10: A Video Processor and Pixel-Shading GPU for Handheld Devices; presented at the Hot Chips conferences on Aug. 23, 2004.
Wilson D., NVIDIA's Tiny 90nm G71 and G73: GeForce 7900 and 7600 Debut; at http://www.anandtech.com/show/1967/2; dated Sep. 13, 2006, retrieved Jun. 16, 2011.
Woods J., Nvidia GeForce FX Preview, at http://www.tweak3d.net/reviews/nvidia/nv30preview/1.shtml; dated Nov. 18, 2002; retrieved Jun. 16, 2011.
NVIDIA Corporation, Technical Brief: Transform and Lighting; dated 1999; month unknown.
Merriam-Webster Dictionary Online; Definition for "program"; retrieved Dec. 14, 2010.
Gadre, S., Patent Application Entitled "Video Processor Having Scalar and Vector Components With Command FIFO for Passing Function Calls From Scalar to Vector", U.S. Appl. No. 11/267,700, filed Nov. 4, 2005.
Gadre, S., Patent Application Entitled "Stream Processing in a Video Processor", U.S. Appl. No. 11/267,599, filed Nov. 4, 2005.
Karandikar et al., Patent Application Entitled: "Multidemnsional Datapath Processing in a Video Processor", U.S. Appl. No. 11/267,638, filed Nov. 4, 2005.
Karandikar et al., Patent Application Entitled: "A Latency Tolerant System for Executing Video Processing Operations", U.S. Appl. No. 11/267,875, filed Nov. 4, 2005.
Kozyrakis, "A Media enhanced vector architecture for embedded memory systems," Jul. 1999, http://digitalassets.lib.berkeley.edu/techreports/ucb/text/CSD-99-1059.pdf.
HPL-PD A Parameterized Research Approach—May 31, 2004 http://web.archive.org/web/*/www.trimaran.org/docs/5_hpl-pd.pdf.

\* cited by examiner

PIPELINED L2 CACHE FOR MEMORY TRANSFERS FOR A VIDEO PROCESSOR This application claims the benefit under 35 U.S.C. Section 119(e) of U.S. Provisional Application Ser. No. 60/628,414, filed on Nov. 15, 2004, to Gadre et al., entitled "A METHOD AND SYSTEM FOR VIDEO PROCESSING" which is incorporated herein in its entirety.

FIELD OF THE INVENTION

The field of the present invention pertains to digital electronic computer systems. More particularly, the present invention relates to a system for efficiently handling video information on a computer system.

BACKGROUND OF THE INVENTION

The display of images and full-motion video is an area of the electronics industry improving with great progress in recent years. The display and rendering of high-quality video, particularly high-definition digital video, is a primary goal of modern video technology applications and devices. Video technology is used in a wide variety of products ranging from cellular phones, personal video recorders, digital video projectors, high-definition televisions, and the like. The emergence and growing deployment of devices capable of high-definition video generation and display is an area of the electronics industry experiencing a large degree of innovation and advancement.

The video technology deployed in many consumer electronics-type and professional level devices relies upon one or more video processors to format and/or enhance video signals for display. This is especially true for digital video applications. For example, one or more video processors are incorporated into a typical set top box and are used to convert HDTV broadcast signals into video signals usable by the display. Such conversion involves, for example, scaling, where the video signal is converted from a non-16×9 video image for proper display on a true 16×9 (e.g., widescreen) display. One or more video processors can be used to perform scan conversion, where a video signal is converted from an interlaced format, in which the odd and even scan lines are displayed separately, into a progressive format, where an entire frame is drawn in a single sweep.

Additional examples of video processor applications include, for example, signal decompression, where video signals are received in a compressed format (e.g., MPEG-2) and are decompressed and formatted for a display. Another example is re-interlacing scan conversion, which involves converting an incoming digital video signal from a DVI (Digital Visual Interface) format to a composite video format compatible with the vast number of older television displays installed in the market.

More sophisticated users require more sophisticated video processor functions, such as, for example, In-Loop/Out-of-loop deblocking filters, advanced motion adaptive de-interlacing, input noise filtering for encoding operations, polyphase scaling/re-sampling, sub-picture compositing, and processor-amplifier operations such as, color space conversion, adjustments, pixel point operations (e.g., sharpening, histogram adjustment etc.) and various video surface format conversion support operation's.

The problem with providing such sophisticated video processor functionality is the fact that a video processor having a sufficiently powerful architecture to implement such functions can be excessively expensive to incorporate into many types of devices. The more sophisticated the video processing functions, the more expensive, in terms of silicon die area, transistor count, memory speed requirements, etc., the integrated circuit device required to implement such functions will be.

Accordingly, prior art system designers were forced to make trade-offs with respect to video processor performance and cost. Prior art video processors that are widely considered as having an acceptable cost/performance ratio have often been barely sufficient in terms of latency constraints (e.g., to avoid stuttering the video or otherwise stalling video processing applications) and compute density (e.g., the number of processor operations per square millimeter of die). Furthermore, prior art video processors are generally not suited to a linear scaling performance requirement, such as in a case where a video device is expected to handle multiple video streams (e.g., the simultaneous handling of multiple incoming streams and outgoing display streams).

Thus what is needed, is a new video processor system that overcomes the limitations on the prior art. The new video processor system should be scalable and have a high compute density to handle the sophisticated video processor functions expected by increasingly sophisticated users.

SUMMARY OF THE INVENTION

Embodiments of the present invention provide a new video processor system that supports sophisticated video processing functions while making efficient use of integrated circuit silicon die area, transistor count, memory speed requirements, and the like. Embodiments of the present invention maintain high compute density and are readily scalable to handle multiple video streams.

In one embodiment, the present invention is implemented as a method for using a pipelined L2 cache to implement memory transfers for a video processor. The method includes accessing a queue of read requests from the video processor. For each of the read requests, a determination is made as to whether there is a cache line hit corresponding to the request. For each cache line miss, a cache line slot is allocated to store a new cache line responsive to the cache line miss. The pipelined L2 cache is non-stalling, such that new read requests can continue to be received and queued without stalling the rest of the video processor. An in-order set of cache lines is output to the video processor responsive to the queue of read requests.

In this manner, the pipelined L2 cache can maintain a significant number of read requests in-flight irrespective of whether the requested data is present within the L2 cache (e.g., cache hit) or whether the requested data is not present (e.g., cache miss) and must be fetched from the high latency frame buffer memory.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
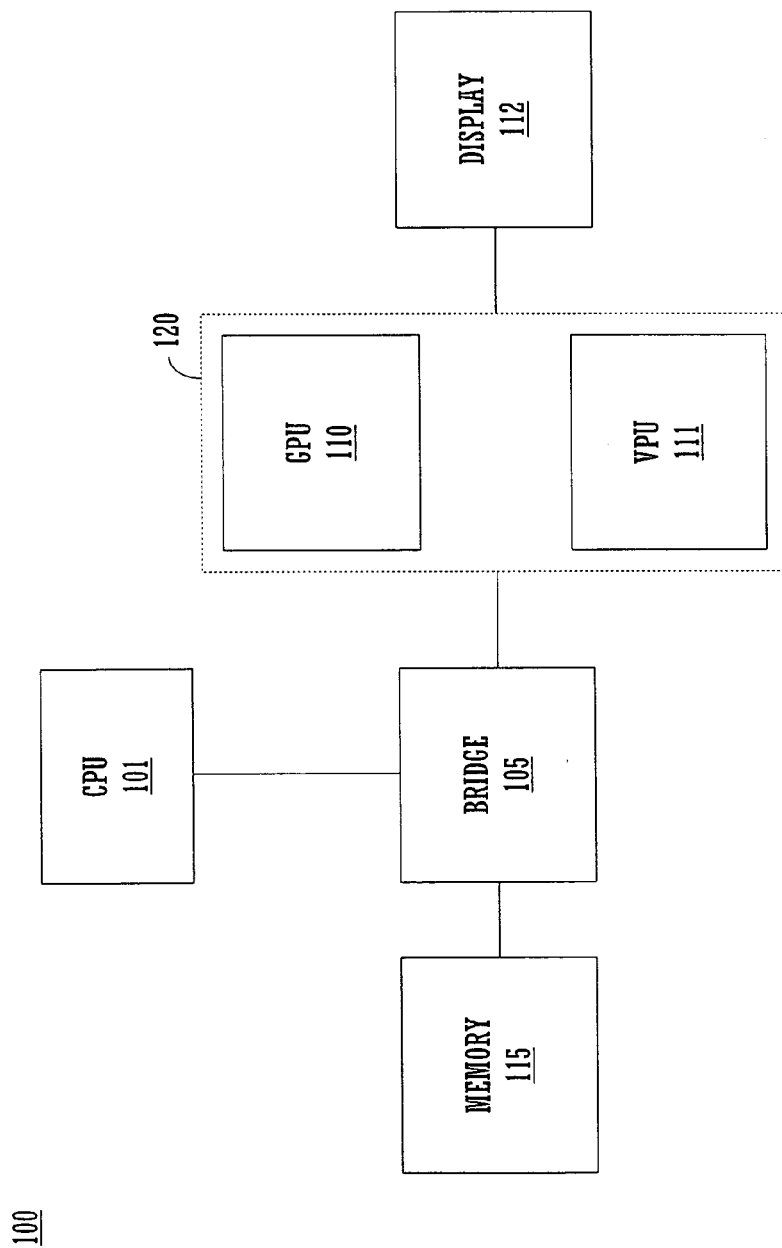
FIG. 1 shows an overview diagram showing the basic components of a computer system in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one, graphics processor unit (GPU) 110 and one video processor unit (VPU) 111. The CPU 101 can be coupled to the system memory 115 via the bridge component 105 or can be directly coupled to the system memory 115 via a memory controller (not shown) internal to the CPU 101. The bridge component 105 (e.g., Northbridge) can support expansion buses that connect various I/O devices (e.g., one or more hard disk drives, Ethernet adapter, CD ROM, DVD, etc.). The GPU 110 and the video processor unit 111 are coupled to a display 112. One or more additional GPUs can optionally be coupled to system 100 to further increase its computational power. The GPU(s) 110 and the video processor unit 111 are coupled to the CPU 101 and the system memory 115 via the bridge component 105. System 100 can be implemented as, for example, a desktop computer system or server computer system, having a powerful general-purpose CPU 101 coupled to a dedicated graphics rendering GPU 110. In such an embodiment, components can be included that add peripheral buses, specialized graphics memory and system memory, JO devices, and the like. Similarly, system 100 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 110 can be implemented as a discrete component, a discrete graphics card designed to couple to the computer system 100 via a connector (e.g., AGP slot, PCI-Express slot, etc.), a discrete integrated circuit die (e.g., mounted directly on the motherboard), or as an integrated GPU included within the integrated circuit die of a computer system chipset component (e.g., integrated within the bridge chip 105). Additionally, a local graphics memory can be included for the GPU 110 for high bandwidth graphics data storage. Additionally, it should be appreciated that the GPU 110 and the video processor unit 111 can be integrated onto the same integrated circuit die (e.g., as component 120) or can be separate discrete integrated circuit components otherwise connected to, or mounted on, the motherboard of computer system 100.

Embodiments of the Present Invention

Figure 2:
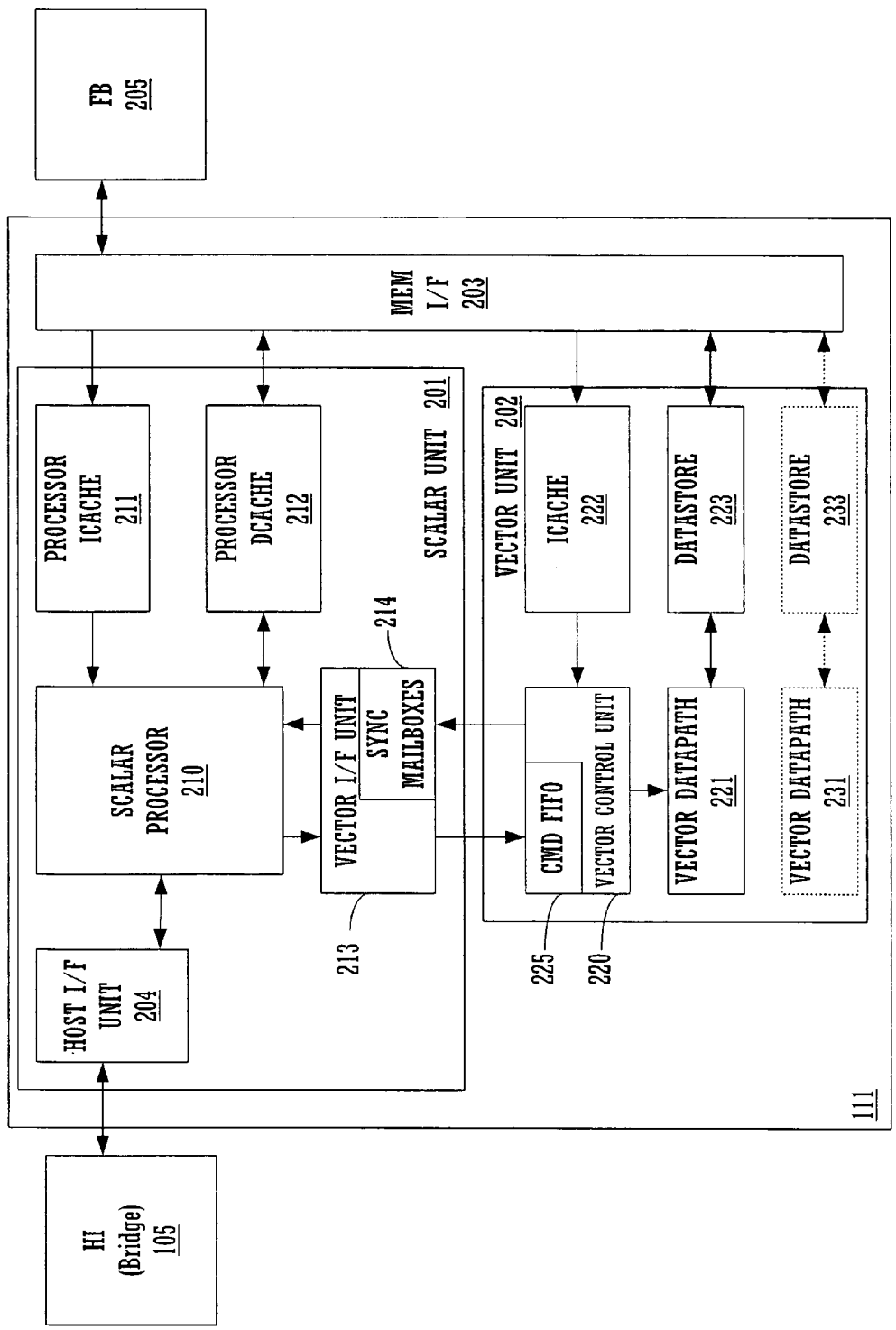
FIG. 2 shows a diagram depicting the internal components of the video processor unit in accordance with one embodiment of the present invention.

FIG. 2 shows a diagram depicting the internal components of the video processor unit 111 in accordance with one embodiment of the present invention. As illustrated in FIG. 2, the video processor unit 111 includes a scalar execution unit 201, a vector execution unit 202, a memory interface 203, and a host interface 204.

In the FIG. 2 embodiment, the video processor unit (hereafter simply video processor) 111 includes functional components for executing video processing operations. The video processor 111 uses the host interface 204 to establish communication between the video processor 111 and the host CPU 101 via the bridge 105. The video processor 111 uses the memory interface 203 to establish communication between the video processor 111 and a frame buffer memory 205 (e.g., for the coupled display 112, not shown). The scalar execution unit 201 is coupled to the host interface 204 and the memory interface 203 and is configured to execute scalar video processing operations. A vector execution unit is coupled to the host interface 204 and the memory interface 203 and is configured to execute vector video processing operations.

The FIG. 2 embodiment illustrates the manner in which the video processor 111 partitions its execution functionality into scalar operations and vector operations. The scalar operations are implemented by the scalar execution unit 201. The vector operations are implemented by the vector execution unit 202.

In one embodiment, the vector execution unit 202 is configured to function as a slave co-processor to the scalar execution unit 201. In such an embodiment, the scalar execution unit manages the workload of the vector execution unit 202 by feeding control streams to vector execution unit 202 and managing the data input/output for vector execution unit 202. The control streams typically comprise functional parameters, subroutine arguments, and the like. In a typical video processing application, the control flow of the application's processing algorithm will be executed on the scalar execution unit 201, whereas actual pixel/data processing operations will be implemented on the vector execution unit 202.

Referring still to FIG. 2, the scalar execution unit 201 can be implemented as a RISC style scalar execution unit incorporating RISC-based execution technologies. The vector execution unit 202 can be implemented as a SIMD machine having, for example, one or more SIMD pipelines. In a 2 SIMD pipeline embodiment, for example, each SIMD pipeline can be implemented with a 16 pixel wide datapath (or wider) and thus provide the vector execution unit 202 with raw computing power to create up to 32 pixels of resulting data output per clock. In one embodiment, the scalar execution unit 201 includes hardware configured to operate using VLIW (very long instruction word) software code to optimize the parallel execution of scalar operations on a per clock basis.

In the FIG. 2 embodiment, the scalar execution unit 201 includes an instruction cache 211 and a data cache 212 coupled to a scalar processor 210. The caches 211-212 interface with the memory interface 203 for access to external memory, such as, for example, the frame buffer 205. The scalar execution unit 201 further includes a vector interface unit 213 to establish communication with the vector execution unit 202. In one embodiment, the vector interface unit 213 can include one or more synchronous mailboxes 214 configured to enable asynchronous communication between the scalar execution unit 201 and the vector execution unit 202.

In the FIG. 2 embodiment, the vector execution unit 202 includes a vector control unit 220 configured to control the operation of a vector execution datapath, vector datapath 221. The vector control unit 220 includes a command FIFO 225 to receive instructions and data from the scalar execution unit 201. An instruction cache 222 is coupled to provide instructions to the vector control unit 220. A datastore memory 223 is coupled to provide input data to the vector datapath 221 and receive resulting data from the vector datapath 221. The datastore 223 functions as an instruction cache and a data RAM for the vector datapath 221. The instruction cache 222 and the datastore 223 are coupled to the memory interface 203 for accessing external memory, such as the frame buffer 205. The FIG. 2 embodiment also shows a second vector datapath 231 and a respective second datastore 233 (e.g., dotted outlines). It should be understood the second vector datapath 231 and the second datastore 233 are shown to illustrate the case where the vector execution unit 202 has two vector execution pipelines (e.g., a dual SIMD pipeline configuration). Embodiments of the present invention are suited to vector execution units having a larger number of vector execution pipelines (e.g., four, eight, sixteen, etc.).

The scalar execution unit 201 provides the data and command inputs for the vector execution unit 202. In one embodiment, the scalar execution unit 201 sends function calls to the vector execution unit 202 using a memory mapped command FIFO 225. Vector execution unit 202 commands are queued in this command FIFO 225.

The use of the command FIFO 225 effectively decouples the scalar execution unit 201 from the vector execution unit 202. The scalar execution unit 201 can function on its own respective clock, operating at its own respective clock frequency that can be distinct from, and separately controlled from, the clock frequency of the vector execution unit 202.

The command FIFO 225 enables the vector execution unit 202 to operate as a demand driven unit. For example, work can be handed off from the scalar execution unit 201 to command FIFO 225, and then accessed by the vector execution unit 202 for processing in a decoupled asynchronous manner. The vector execution unit 202 would thus process its workload as needed, or as demanded, by the scalar execution unit 201. Such functionality would allow the vector execution unit 202 to conserve power (e.g., by reducing/stopping one or more internal clocks) when maximum performance is not required.

The partitioning of video processing functions into a scalar portion (e.g., for execution by the scalar execution unit 201) and a vector portion (e.g., for execution by the vector execution unit 202) allow video processing programs built for the video processor 111 to be compiled into separate scalar software code and vector software code. The scalar software code and the vector software code can be compiled separately and subsequently linked together to form a coherent application.

The partitioning allows vector software code functions to be written separately and distinct from the scalar software code functions. For example, the vector functions can be written separately (e.g., at a different time, by different team of engineers, etc.) and can be provided as one or more subroutines or library functions for use by/with the scalar functions (e.g., scalar threads, processes, etc.). This allows a separate independent update of the scalar software code and/or the vector software code. For example, a vector subroutine can be independently updated (e.g., through an update of the previously distributed program, a new feature added to increase the functionality of the distributed program, etc.) from a scalar subroutine, or vice versa. The partitioning is facilitated by the separate respective caches of the scalar processor 210 (e.g., caches 211-212) and the vector control unit 220 and vector datapath 221 (e.g., caches 222-223). As described above, the scalar execution unit 201 and the vector execution unit 202 communicate via the command FIFO 225.

Figure 3:
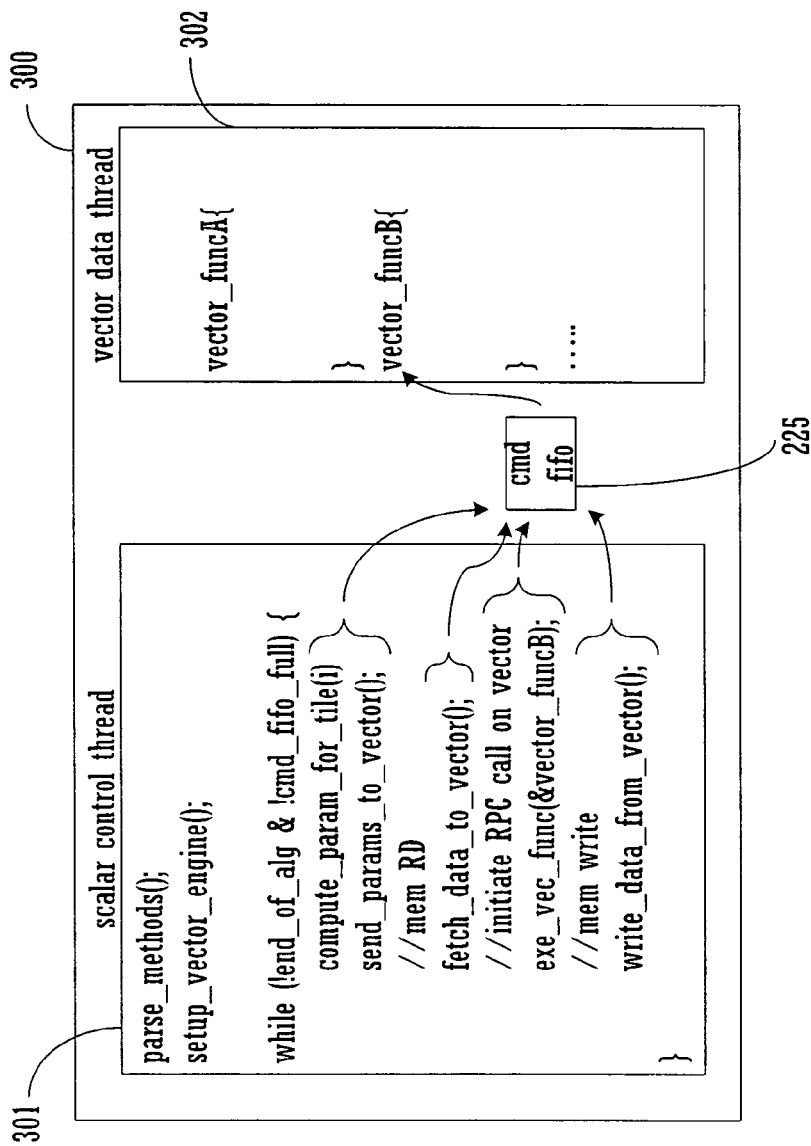
FIG. 3 shows a diagram of an exemplary software program for the video processor in accordance with one embodiment of the present invention.

FIG. 3 shows a diagram of an exemplary software program 300 for the video processor 111 in accordance with one embodiment of the present invention. As depicted in FIG. 3, the software program 300 illustrates attributes of a programming model for the video processor 111, whereby a scalar control thread 301 is executed by the video processor 111 in conjunction with a vector data thread 302.

The software program 300 example of the FIG. 3 embodiment illustrates a programming model for the video processor 111, whereby a scalar control program (e.g., scalar control thread 301) on the scalar execution unit 201 executes subroutine calls (e.g., vector data thread 302) on the vector execution unit 202. The software program 300 example shows a case where a compiler or software programmer has decomposed a video processing application into a scalar portion (e.g., a first thread) and a vector portion (e.g., a second thread).

As shown in FIG. 3, the scalar control thread 301 running on the scalar execution unit 201 is computing work parameters ahead of time and feeding these parameters to the vector execution unit 202, which performs the majority of the processing work. As described above, the software code for the two threads 301 and 302 can be written and compiled separately.

The scalar thread is responsible for following:
1. Interfacing with host unit 204 and implementing a class interface;
2. Initialization, setup and configuration of the vector execution unit 202; and
3. Execution of the algorithm in work-units, chunks or working sets in a loop, such that with each iteration;
a. the parameters for current working set are computed;
b. the transfer of the input data into vector execution unit is initiated; and
c. the transfer of the output data from vector execution unit is initiated.

The typical execution model of the scalar thread is "fire-and-forget". The term fire-and-forget refers to the attribute whereby, for a typical model for a video baseband processing application, commands and data are sent to the vector execution unit 202 from the scalar execution unit 201 (e.g., via the command FIFO 225) and there is no return data from the vector execution unit 202 until the algorithm completes.

In the program 300 example of FIG. 3, the scalar execution unit 201 will keep scheduling work for vector execution unit 202 until there is no longer any space in command FIFO 225 (e.g., !end_of_alg & !cmd_fifo_full). The work scheduled by the scalar execution unit 201 computes parameters and sends these parameters to the vector subroutine, and subsequently calls the vector subroutine to perform the work. The execution of the subroutine (e.g., vector_funcB) by the vector execution unit 202 is delayed in time, mainly to hide the latency from main memory (e.g., system memory 115). Thus, the architecture of the video processor 111 provides a latency compensation mechanism on the vector execution unit 202 side for both instruction and data traffic. These latency compensation mechanisms are described in greater detail below.

It should be noted that the software program 300 example would be more complex in those cases where there are two or more vector execution pipelines (e.g., vector datapath 221 and second vector datapath 231 of FIG. 2). Similarly, the software program 300 example would be more complex for those situations where the program 300 is written for a computer system having two vector execution pipelines, but yet retains the ability to execute on a system having a single vector execution pipeline.

Thus, as described above in the discussion of FIG. 2 and FIG. 3, the scalar execution unit 201 is responsible for initiating computation on the vector execution unit 202. In one embodiment, the commands passed from the scalar execution unit 201 to the vector execution unit 202 are of the following main types:
1. Read commands (e.g., memRd) initiated by the scalar execution unit 201 to transfer current working set data from memory to data RAMs of the vector execution unit 202;
2. Parameter passing from the scalar execution unit 201 to the vector execution unit 202;
3. Execute commands in the form of the PC (e.g., program counter) of the vector subroutine to be executed; and
4. Write commands (e.g., memWr) initiated by scalar execution unit 201 to copy the results of the vector computation into memory.

In one embodiment, upon receiving these commands the vector execution unit 202 immediately schedules the memRd commands to memory interface 203 (e.g., to read the requested data from the frame buffer 205). The vector execution unit 202 also examines the execute commands and prefetches the vector subroutine to be executed (if not present in the cache 222).

The objective of the vector execution unit 202 in this situation is to schedule ahead the instruction and data steams of the next few executes while the vector execution unit 202 is working on current execute. The schedule ahead features effectively hide the latency involved in fetching instructions/data from their memory locations. In order to make these read requests ahead of time, the vector execution unit 202, the datastore (e.g., datastore 223), and the instruction cache (e.g., cache 222) are implemented by using high speed optimized hardware.

As described above, the datastore (e.g., datastore 223) functions as the working RAM of the vector execution unit 202. The scalar execution unit 201 perceives and interacts with the datastore as if it were a collection of FIFOs. The FIFOs comprise the "streams" with which the video processor 111 operates. In one embodiment, streams are generally input/output FIFOs that the scalar execution unit 201 initiates the transfers (e.g., to the vector execution unit 202) into. As described above, the operation of the scalar execution unit 201 and the vector execution unit 202 are decoupled.

Once the input/output streams are full, a DMA engine within the vector control unit 220 stops processing the command FIFO 225. This soon leads to the command FIFO 225 being full. The scalar execution unit 201 stops issuing additional work to the vector execution unit 202 when the command FIFO 225 is full.

In one embodiment, the vector execution unit 202 may need intermediate streams in addition to the input and output streams. Thus the entire datastore 223 can be seen as a collection of streams with respect to the interaction with the scalar execution unit 201.

Figure 4:
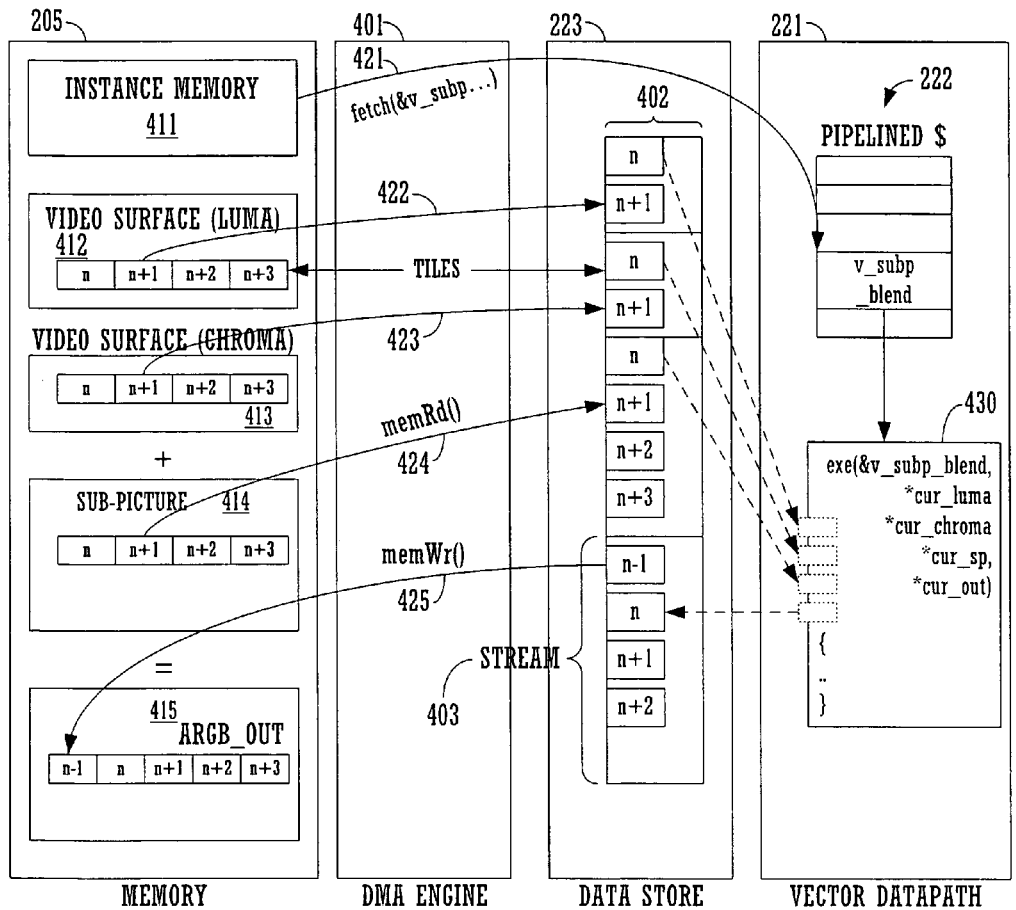
FIG. 4 shows an example for sub-picture blending with video using a video processor and accordance with one embodiment of the present invention.

FIG. 4 shows an example for sub-picture blending with video using a video processor in accordance with one embodiment of the present invention. FIG. 4 shows an exemplary case where a video surface is blended with a sub-picture and then converted to an ARGB surface. The data comprising the surfaces are resident in frame buffer memory 205 as the Luma parameters 412 and Chroma parameters 413. The sub-picture pixel elements 414 are also resident in the frame buffer memory 205 as shown. The vector subroutine instructions and parameters 411 are instantiated in memory 205 as shown.

In one embodiment, each stream comprises a FIFO of working 2D chunks of data called "tiles". In such an embodiment, the vector execution unit 202 maintains a read tile pointer and a write tile pointer for each stream. For example, for input streams, when a vector subroutine is executed, the vector subroutine can consume, or read, from a current (read) tile. In the background, data is transferred to the current (write) tile by memRd commands. The vector execution unit can also produce output tiles for output streams. These tiles are then moved to memory by memWr( ) commands that follow the execute commands. This effectively pre-fetches tiles and has them ready to be operated on, effectively hiding the latency.

In the FIG. 4 sub-picture blending example, the vector datapath 221 is configured by the instantiated instance of the vector sub routine instructions and parameters 411 (e.g., &v_subp_blend). This is shown by the line 421. The scalar execution unit 201 reads in chunks (e.g., tiles) of the surfaces and loads them into datastore 223 using the DMA engine 401 (e.g., within the memory interface 203). The load operation is shown by line 422, line 423, and line 424.

Referring still to FIG. 4, since there are multiple input surfaces, multiple input streams need to be maintained. Each stream has a corresponding FIFO. Each stream can have different number of tiles. The FIG. 4 example shows a case where the sub-picture surface is in system memory 115 (e.g., sub-picture pixel elements 414) and hence would have additional buffering (e.g., n, n+1, n+2, n+3, etc.), whereas the video stream (e.g., Luma 412, Chroma 413, etc.) can have a smaller number of tiles. The number of buffers/FIFOs used can be adjusted in accordance with the degree of latency experienced by stream.

As described above, the datastore 223 utilizes a look ahead prefetch method to hide latency. Because of this, a stream can have data in two or more tiles as the data is prefetched for the appropriate vector datapath execution hardware (e.g., depicted as FIFO n, n+1, n+2, etc.).

Once the datastore is loaded, the FIFOs 402 are accessed by the vector datapath hardware 221 and operated upon by the vector subroutine (e.g., subroutine 430). The results of the vector datapath operation comprises an output stream 403. This output stream is copied by the scalar execution unit 201 via the DMA engine 401 back into the frame buffer memory 205 (e.g., ARGB_OUT 415). This shown by the line 425.

Thus, embodiments of the present invention utilize an important aspect of stream processing, which is the fact that data storage and memory is abstracted as a plurality of memory titles. Hence, a stream can be viewed as a sequentially accessed collection of tiles. Streams are used to prefetch data. This data is in the form of tiles. The tiles are prefetched to hide latency from the particular memory source the data originates from (e.g., system memory, frame buffer memory, or the like). Similarly, the streams can be destined for different locations (e.g., caches for vector execution unit, caches for scalar execution unit, frame buffer memory, system memory, etc.). Another characteristic of streams is that they generally access tiles in a lookahead prefetching mode. As described above, the higher the latency, the deeper the prefetching and the more buffering that is used per stream (e.g., as depicted in FIG. 4).

Figure 5:
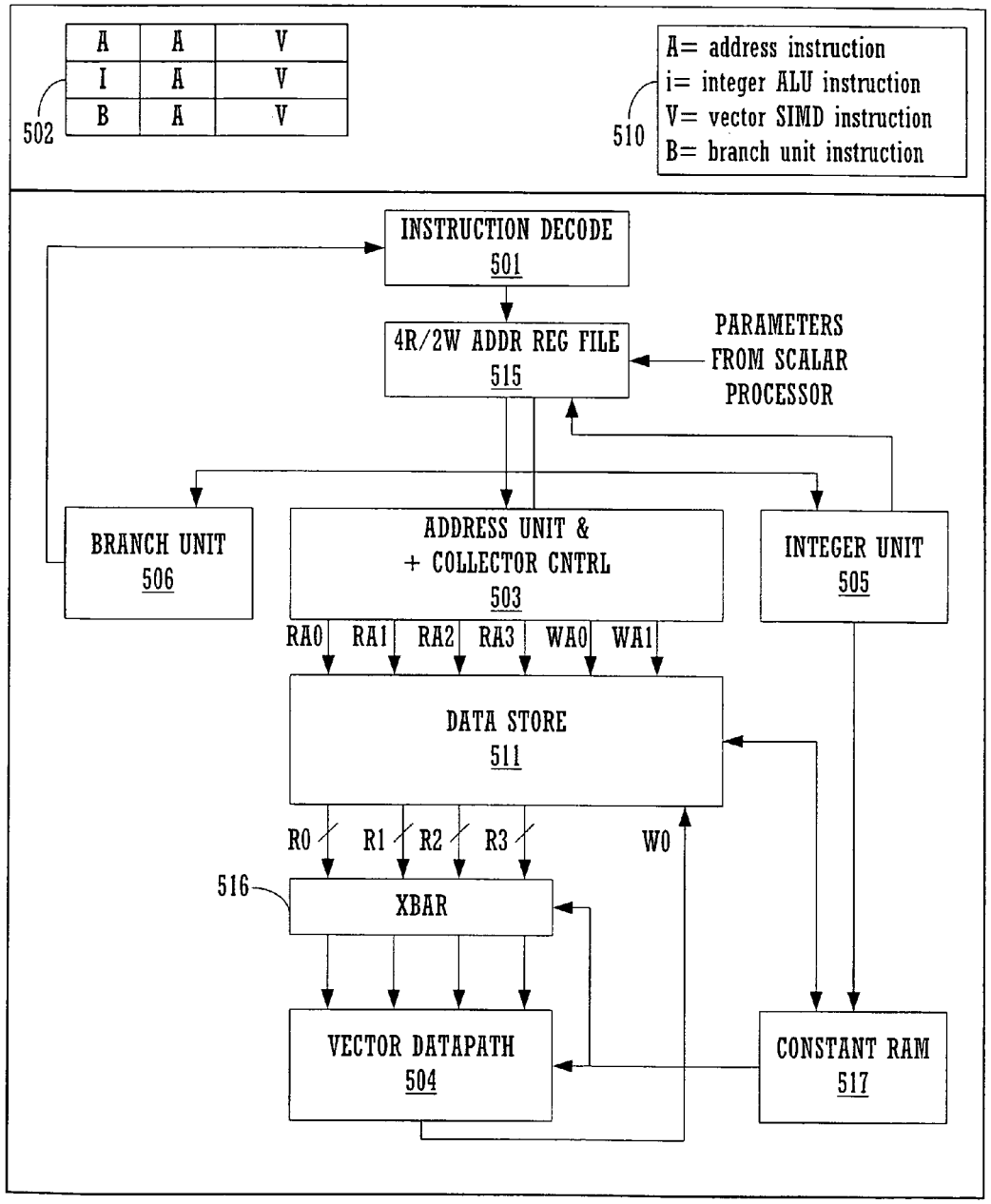
FIG. 5 shows a diagram depicting the internal components of a vector execution in accordance with one embodiment of the present invention.

FIG. 5 shows a diagram depicting the internal components of a vector execution unit in accordance with one embodiment of the present invention. The diagram of FIG. 5 shows an arrangement of the various functional units and register/SRAM resources of the vector execution unit 202 from a programming point of view.

In the FIG. 5 embodiment, the vector execution unit 202 comprises a VLIW digital signal processor optimized for the performance of video baseband processing and the execution of various codecs (compression-decompression algorithms). Accordingly, the vector execution unit 202 has a number of attributes directed towards increasing the efficiency of the video processing/codec execution.

In the FIG. 5 embodiment, the attributes comprise:
1. Scalable performance by providing the option for the incorporation of multiple vector execution pipelines;
2. The allocation of 2 data address generators (DAGs) per pipe;
3. Memory/Register operands;
4. 2D (x,y) pointers/iterators;
5. Deep pipeline (e.g., 11-12) stages;
6. Scalar (integer)/branch units;
7. Variable instruction widths (Long/Short instructions);
8. Data aligners for operand extraction;
9. 2D datapath (4×4) shape of typical operands and result; and
10. Slave vector execution unit to scalar execution unit, executing remote procedure calls.

Generally, a programmer's view of the vector execution unit 202 is as a SIMD datapath with 2 DAGs 503. Instructions are issued in VLIW manner (e.g., instructions are issued for the vector datapath 504 and address generators 503 simultaneously) and are decoded and dispatched to the appropriate execution unit by the instruction decoder 501. The instructions are of variable length, with the most commonly used instructions encoded in short form. The full instruction set is available in the long form, as VLIW type instructions.

The legend 502 shows three clock cycles having three such VLIW instructions. In accordance with the legend 510, the uppermost of the VLIW instructions 502 comprises two address instructions (e.g., for the 2 DAGs 503) and one instruction for the vector datapath 504. The middle VLIW instruction comprises one integer instruction (e.g., for the integer unit 505), one address instruction, and one vector instruction. The lower most VLIW instruction comprises a branch instruction (e.g., for the branch unit 506), one address instruction, and one vector instruction.

The vector execution unit can be configured to have a single data pipe or multiple data pipes. Each data pipe consists of local RAM (e.g., a datastore 511), a crossbar 516, 2 DAGs 503, and a SIMD execution unit (e.g., the vector datapath 504). FIG. 5 shows a basic configuration for explanatory purposes, where only 1 data pipe is instantiated. When 2 data pipes are instantiated, they can run as independent threads or as cooperative threads.

Six different ports (e.g., 4 read and 2 write) can be accessed via an address register file unit 515. These registers receive parameters from the scalar execution unit or from the results of the integer unit 505 or the address unit 503. The DAGs 503 also function as a collection controller and manages the distribution of the registers to address the contents of the datastore 511 (e.g., RA0, RA1, RA2, RA3, WA0, and WA1). A crossbar 516 is coupled to allocate the output data ports R0, R1, R2, R3 in any order/combination into the vector datapath 504 to implement a given instruction. The output of the vector datapath 504 for can be fed back into the datastore 511 as indicated (e.g., W0). A constant RAM 517 is used to provide frequently used operands from the integer unit 505 to the vector datapath 504, and the datastore 511.

Figure 6:
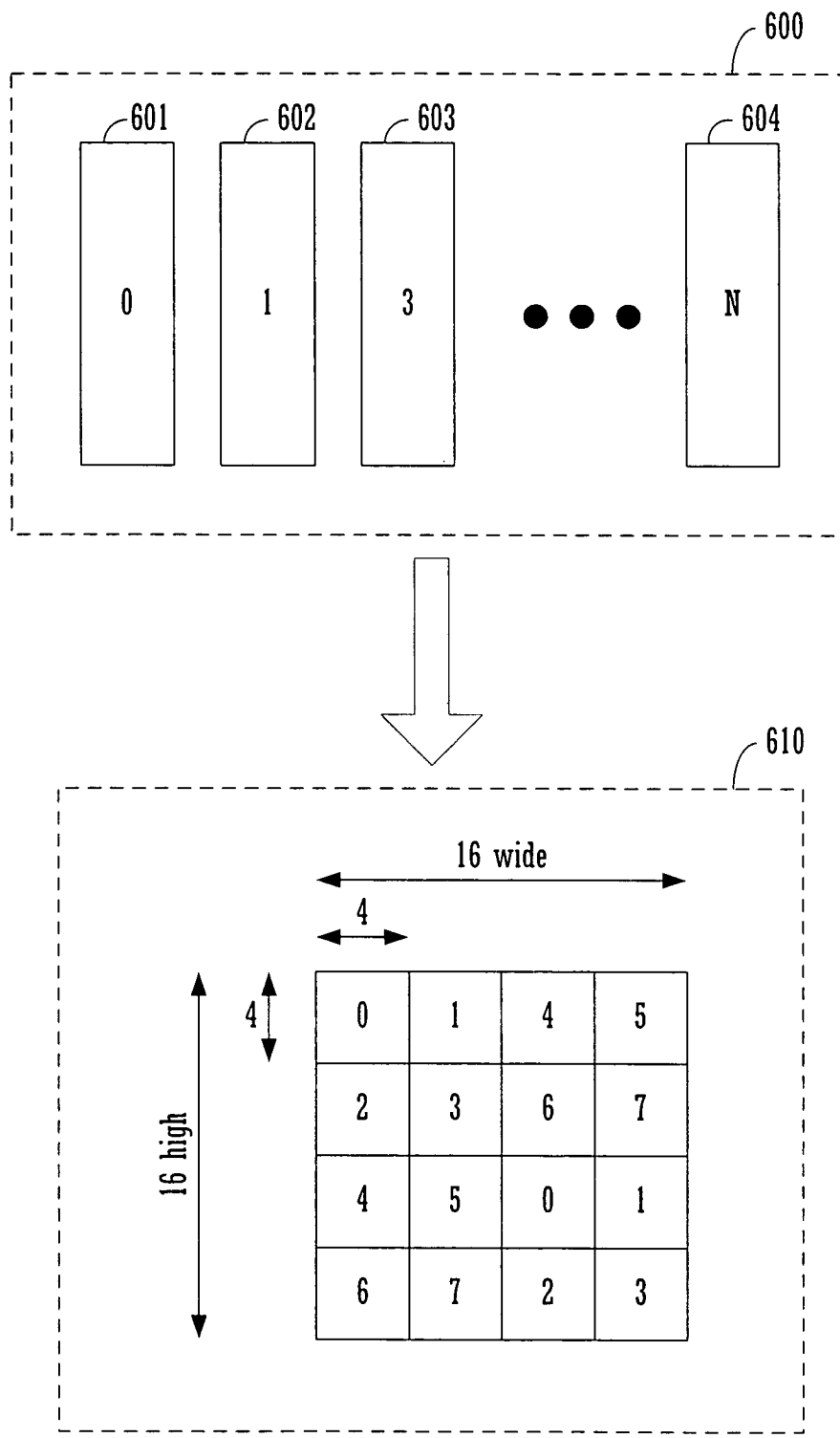
FIG. 6 shows a diagram depicting the layout of a datastore memory having a symmetrical array of tiles in accordance with one embodiment of the present invention.

FIG. 6 shows a diagram depicting a plurality of banks 601-604 of a memory 600 and a layout of a datastore having a symmetrical array of tiles 610 in accordance with one embodiment of the present invention. As depicted in FIG. 6, for explanatory purposes, only a portion of the datastore 610 is shown. The datastore 610 logically comprises an array (or arrays) of tiles. Each tile is an array of sub-tiles of 4×4 shape. Physically, as shown by the memory 600, the data store 610 is stored in an array of "N" physical banks of memory (e.g., banks 601-604).

Additionally, the data store 610 visually depicts a logical tile in a stream. In the FIG. 6 embodiment, this tile is 16 bytes high and 16 bytes wide. This tile is an array of subtiles (in this example 4×4). Each subtile is stored in a physical bank. This is shown in FIG. 6 by the number within each 4×4 subtile, in a case where there are 8 banks of physical memory (e.g., banks 0 through 7). The organization of subtiles in banks is done such that there is no common bank in 2×2 arrangement of subtitles. This makes any unaligned access (e.g., in both x and y direction) possible without any bank collision.

The banks 601-604 are configured to support accesses to different tiles of each bank. For example, in one case, the crossbar 516 can access a 2×4 set of tiles from bank 601 (e.g., the first two rows of bank 601). In another case, the crossbar 516 can access a 1×8 set of tiles from two adjacent banks. Similarly, in another case, the crossbar 516 can access an 8×1 set of tiles from two adjacent banks. In each case, the DAGs/collector 503 can receive the tiles as the banks are accessed by the crossbar 516, and provide those tiles to the front end of the vector datapath 504 on a per clock basis.

In this manner, embodiments of the present invention provide a new video processor architecture that supports sophisticated video processing functions while making efficient use of integrated circuit silicon die area, transistor count, memory speed requirements, and the like. Embodiments of the present invention maintain high compute density and are readily scalable to handle multiple video streams. Embodiments of the present invention can provide a number of sophisticated video processing operations such as, for example, MPEG-2/WMV9/H.264 encode assist (e.g., In-loop decoder), MPEG-2/WMV9/H.264 decode (e.g., post entropy decoding), and In Loop/Out of loop deblocking filters.

Additional video processing operations provided by embodiments of the present invention include, for example, advanced motion adaptive deinterlacing, input noise filtering for encoding, polyphase scaling/resampling, and sub-picture compositing. The video processor architecture of the present invention can also be used for certain video processor-amplifier (procamp) applications such as, for example, color space conversion, color space adjustments, pixel point operations such as sharpening, histogram adjustment, and various video surface format conversions.

Figure 7:
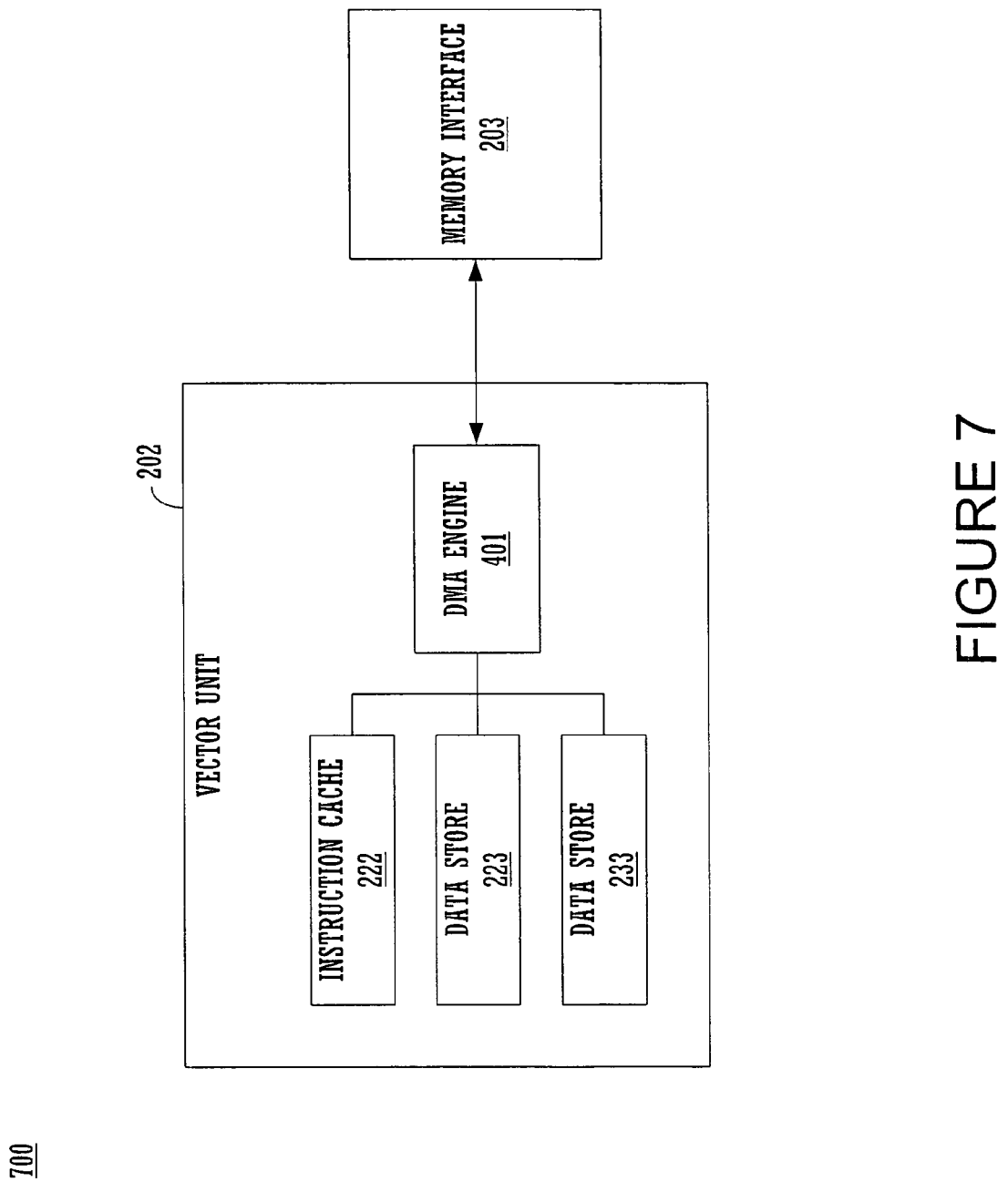
FIG. 7 shows a diagram depicting a DMA engine in accordance with one embodiment of the present invention.

FIG. 7 shows a diagram 700 depicting a DMA engine in accordance with one embodiment of the present invention. As depicted in diagram 700, the DMA engine 401 is shown incorporated within the vector execution unit 202 along with the instruction cache 222, the data store 223, and a second data store 233. The DMA engine 401 is coupled to communicate with the memory interface 203 as shown.

In the FIG. 7 embodiment, the DMA engine 401 is configured to implement a number of different DMA memory access methods in support of the video processing operations executed by the video processor (e.g., video processor 111), or more specifically, the vector execution unit 202. In addition to different DMA memory access methods, the DMA engine 401 is configured to format, process, and arrange data that is written to the frame buffer memory 205 and data is read from the frame buffer memory 205. This data can be stored into the data stores 223 and 233 or the instruction cache 222. This further processing of the data, in addition to the mere reading and/or writing of the data, significantly offloads a significant amount of work from the vector execution unit 202, and thus the video processor 111.

In one embodiment, the DMA engine 401 comprises a programmable engine configured to run one or more DMA control programs. The DMA control programs control the memory transfers between the frame buffer memory 205 and the vector execution unit 202. One or more DMA control programs are stored within the DMA engine 401 and are accessed to implement the different kinds of DMA operations. These DMA control programs can be updated and/or replaced as needed to implement new or different types of DMA operations. This functionality enables the implementation and support of new and different types of video processing applications.

The video processor 111 communicates with the DMA engine 401 by using a number of high-level commands. These high-level commands correspond to certain high-level types of functions. The DMA engine 401 receives these high-level commands and executes a series of comparatively low-level commands that implement the high-level types of functions. For example, the video processor 111 can use one high-level command to indicate a certain image, a certain data structure, or the like is required from the frame buffer 205. To fulfill the request, the DMA engine 401 will execute one or more a DMA control programs that correspond to the high-level command. Generally, a DMA control program comprises a subroutine having series of low-level frame buffer access commands. In this case, the subroutine provides the necessary instructions for the hardware to retrieve the required image, data structure, or the like, and provide constituent data to the video processor 111.

The DMA engine 401 supports a number of processing functions in addition to the mere reading or writing of data. By supporting these processing functions, a number of processor cycles of the video processor 111 can be used on other more important tasks. These processing functions are now described.

In one embodiment, the video processor 111 can issue one or more high-level pixel level formatting commands to the DMA engine 401. The pixel level formatting commands typically comprise video processing operations such as shifting (e.g., shift a 10 bit value left or right some number of bits), clamping (e.g., clamping some 10 bit value to within a valid range), saturation, permutations, or the like being performed on the constituent data comprising the pixels. For example, instead of merely fetching the pixel data from the frame buffer 205 and performing the pixel level formatting within the video processor 111, the video processor 111 issues a high-level command to the DMA engine 401 to fetch the request of pixel data and perform the pixel level formatting using the hardware of the DMA engine 401. Upon completion of the pixel level formatting, the resulting data is forwarded to the video processor 111.

Another example would be a case where the high-level command issued by the video processor 111 comprises a 2-D command. A 2-D command refers to a case where the video processor 111 requests a rectangular block of pixels. This block of pixels will be some number of pixels high by some numbers of pixels wide (e.g., 2-D). To execute the high-level command, the DMA engine 401 executes a plurality of tile fetch commands to assemble the data comprising the 2-D command and provide the data to the video processor 111. For example, in one embodiment, the DMA engine 401 is configured to fetch data from the frame buffer in the form of 32×32 tiles (e.g., tiles measuring 32 pixels by 32 pixels). In the case where a high-level command requests a 320×640 2-D block, the DMA engine 401 executes the low-level instructions required to fetch the appropriate number of 32×32 tiles in order to fulfill the requested 320×640 block.

Another similar example to the 2-D block request high-level command is a case where the high-level command comprises an image access command. With an image access high-level command, the DMA engine 401 implements one of a number of its available tiling modes to most efficiently fetch the requested image from the frame buffer 205. For example, depending upon characteristics of the requested image, different sized tiles can be used (e.g., 32×32, 16×16, etc.), and these tiles can be fetched sequentially from left to right, top to bottom, or the like. Generally, each of the different tiling modes is implemented via its corresponding DMA control program.

It should be noted that, as described above, the executing of the DMA control programs by the DMA engine 401 is specifically configured to implement the DMA requests for the video processor (e.g., the vector execution unit 202). In other words, these DMA control programs and hardware which execute the DMA control programs is specifically configured to reduce a workload of the video processor 111.

Figure 8:
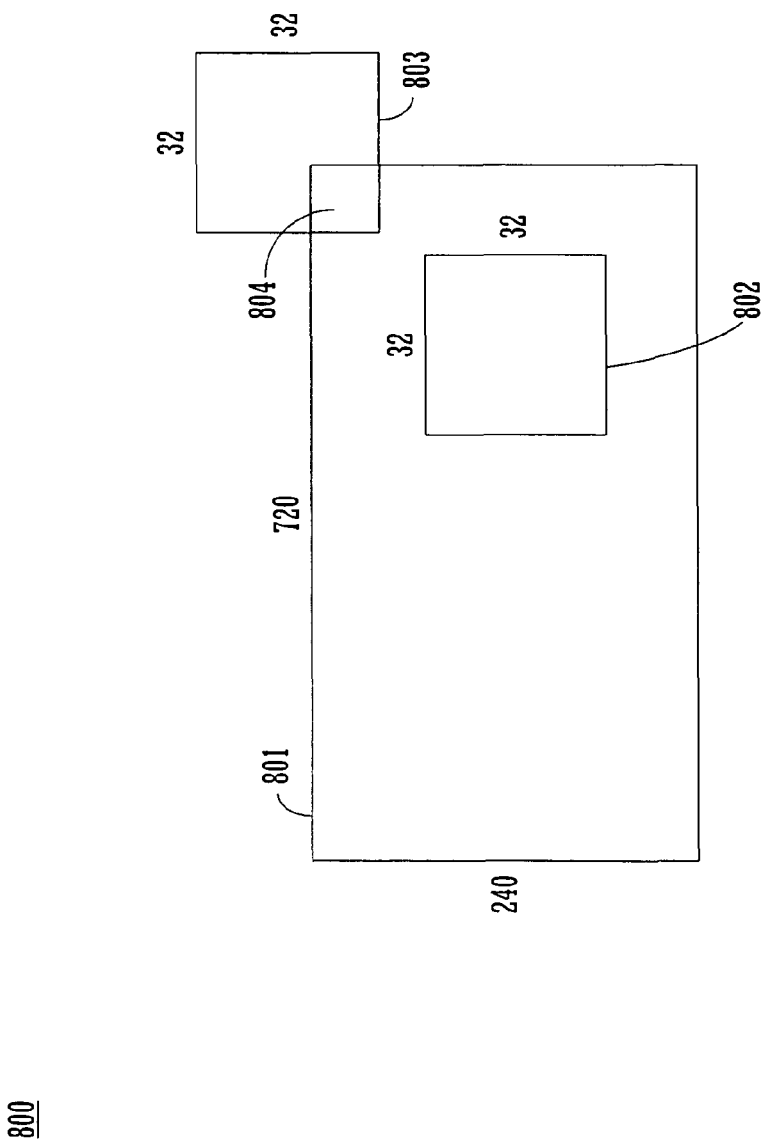
FIG. 8 shows a diagram depicting a boundary tile access method as implemented by the DMA engine in accordance with one embodiment of the present invention.

FIG. 8 shows a diagram 800 depicting a boundary tile access method as implemented by the DMA engine 401 in accordance with one embodiment of the present invention. As illustrated in FIG. 8, diagram 800 shows a 240×720 pixel image 801 and an interior 32×32 tile 802, a boundary 32×32 tile 803, and a 4×16 tile 805 (e.g., one 4×16 tile from the 4×720 top edge of the image 801).

The FIG. 8 embodiment shows a case where the high-level command comprises a boundary tile access of the image 801. A boundary tile access refers to those situations where tiles which straddle the edge of the image need to be fetched from the frame buffer. Such boundary tiles need to be treated differently than tiles which are entirely within the interior of the image.

For example, as shown in FIG. 8, tile 802 is an interior tile whereas tile 803 is a boundary tile. For the interior tile, the DMA engine can simply fetch all the constituent pixels comprising 32×32 tile 802. However, for a boundary tile (e.g., tile 803), some portion of the data comprising the 32×32 tile lies outside the boundary of the image 801. This data that lies outside the boundary of the image 801 needs to be properly cropped off, such that only the portion of the data that lies within the image 801 is returned (e.g., portion 804). This Cropping operation requires that a number of low-level instructions be executed, and this execution is handled by the DMA engine 401 as opposed to other video processor hardware.

Figure 9:
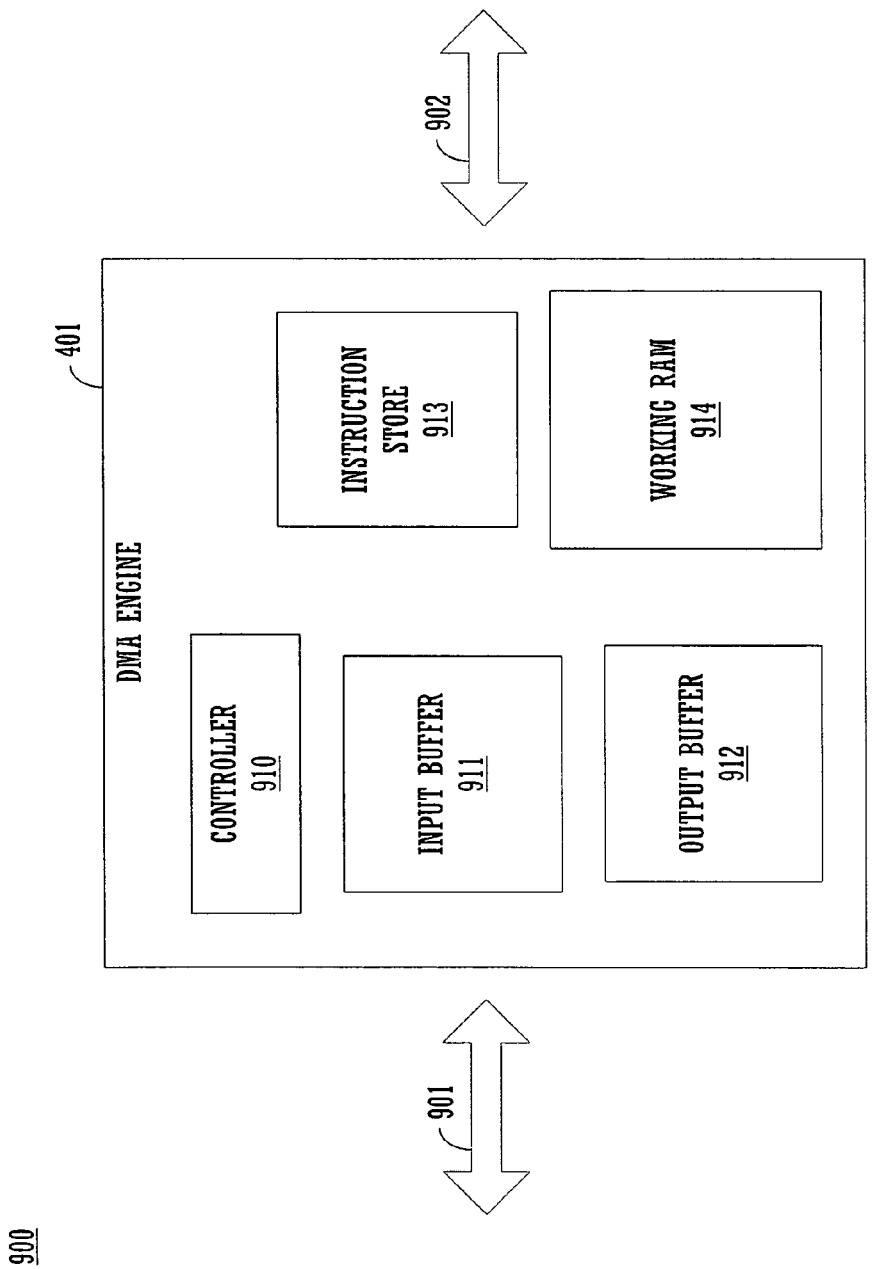
FIG. 9 shows a diagram depicting the internal components of the DMA engine in accordance with one embodiment of the present invention.

FIG. 9 shows a diagram 900 depicting the internal components of the DMA engine 401 in accordance with one embodiment of the present invention. As described above, the DMA engine 401 comprises programmable DMA execution unit configured to provide a number of memory access functions for the video processor 111. One or more DMA control programs are stored into an instruction store unit 913 of the DMA engine 401. The DMA control programs are used to implement the various types of DMA requests received from the video processor 111, as described above. DMA requests are received via an input bus 901. As DMA requests are received, a DMA controller 910 receives the request and accesses and executes an appropriate DMA control program. The controller 910 implements the pixel level processing and pixel level formatting commands by using the working RAM 914. The memory interface 203 and the frame buffer 205 are accessed via an output bus 902. The input buffer 911 is used to transmit and receive data to the video processor hardware. The output buffer 912 is used to transmit and receive data to the memory interface 203 and the frame buffer 205.

In this manner, the programmable DMA engine can be optimized to efficiently implement a number of different types of DMA accesses to and from the frame buffer memory on behalf of the video processor. This optimization makes such memory accesses much more efficient than similar accesses using the hardware of the video processor.

Figure 10:
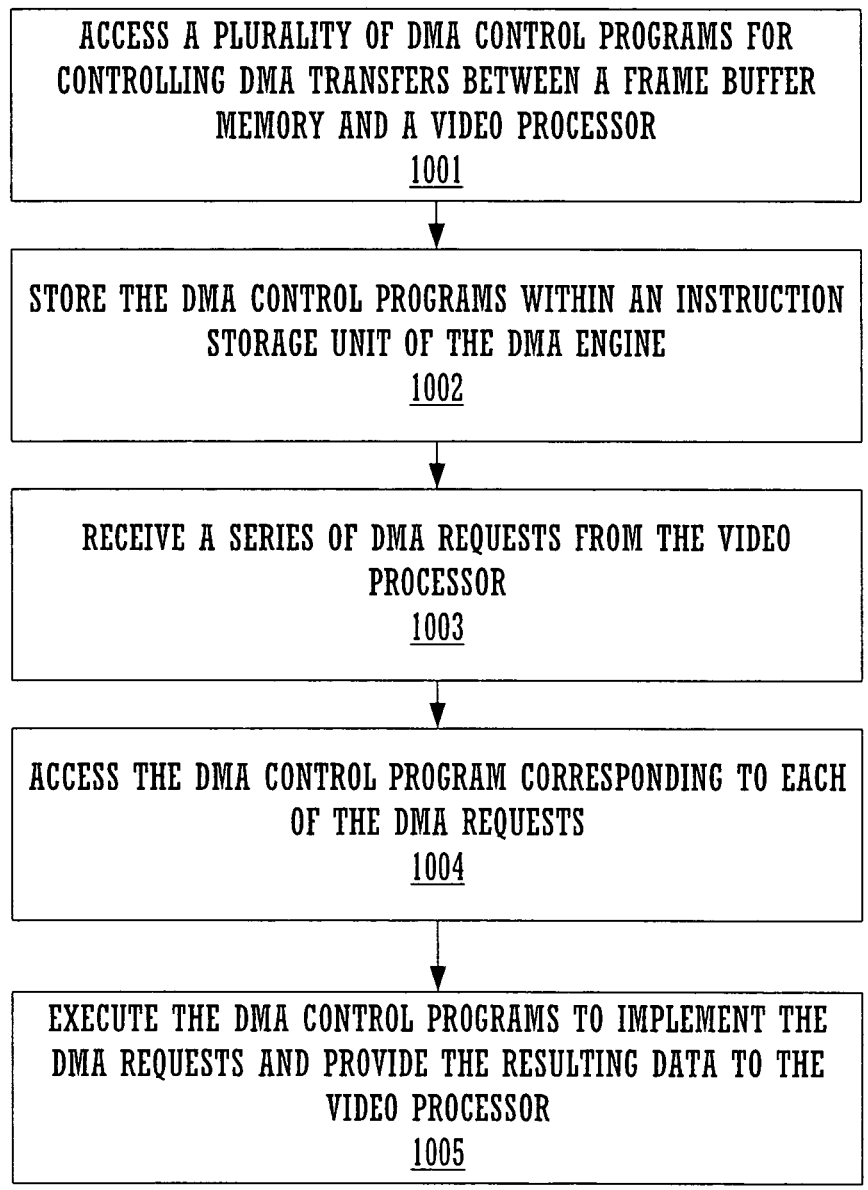
FIG. 10 shows a flow chart of the steps of a process for implementing programmable DMA transfers for a video processor in accordance with one embodiment of the present invention.

FIG. 10 shows a flow chart of the steps of a process 1000 for implementing programmable DMA transfers for a video processor in accordance with one embodiment of the present invention. As shown in FIG. 10, process 1000 shows the operating steps of a programmable DMA engine (e.g., DMA engine 401) performed in implementing a number of high-level commands from a video processor.

Process 1000 begins in step 1001, where a plurality of DMA control programs are accessed. As described above, DMA control programs are for controlling the DMA transfers and the pixel level formatting associated with such transfers. In the present embodiment, the DMA transfers are executed between a frame buffer memory (e.g., frame buffer memory 205) and a video processor (e.g., video processor 111). In step 1002, the DMA engine stores the DMA control programs within an internal instruction storage unit (e.g., instruction storage unit 913 of FIG. 9).

In step 1003, the DMA engine 401 receives a series of DMA requests from the scalar execution unit 201 or the vector execution unit 202. As described above, these requests are in the form of high-level commands, and these high-level commands are configured to reduce the amount of work that needs to be performed by the scalar execution unit 201 or the vector execution unit 202. In step 1004, the DMA engine accesses the DMA control program corresponding to each of the DMA requests. Subsequently, in step 1005, the corresponding DMA control program is executed for each of the pending DMA requests. A controller 910 within the DMA engine 401 accesses the instruction store unit 913 and executes the constituent low-level instructions corresponding to the high-level instructions received from the scalar execution unit 201 or vector execution unit 202. The resulting data is then provided to the video processor 111. The vector execution unit 202 issues the read requests ahead to hide latency.

Figure 11:
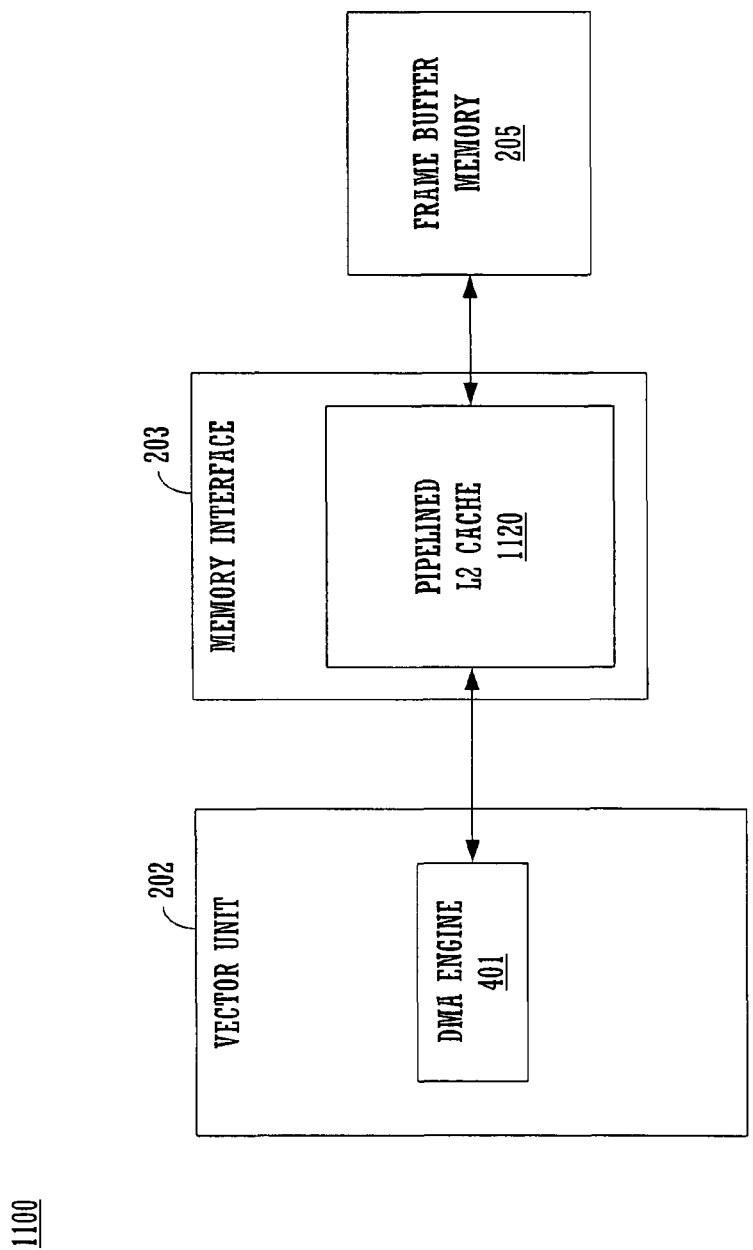
FIG. 11 shows a diagram showing a pipelined L2 cache within the memory interface in accordance with one embodiment of the present invention.

FIG. 11 shows a diagram 1100 showing a pipelined L2 cache 1120 within the memory interface 203 in accordance with one embodiment of the present invention. As depicted in FIG. 11, the pipelined L2 cache 1120 (e.g., or cache 1120) is coupled to the DMA engine 401 and the frame buffer memory 205.

In the FIG. 11 embodiment, the cache 1120 is used to implement memory transfers for various functional components of a video processor (e.g., video processor 111). FIG. 11 shows a case where the cache 1120 is used to provide data from the frame buffer memory 205 to the DMA engine 401. Such data is used by the DMA engine 401 to implement high-level DMA commands, as described above. The cache 1120 is an "L2" cache due to the fact that various other functional components of the video processor 111 incorporate their own respective caches. These caches are essentially L1 caches optimized to provide extremely high-speed low latency access to a comparatively small amount of data. The cache 1120 functions as an L2 cache since it provides a much larger amount memory (e.g., in comparison to the L1 caches) and since it is shared among the various functional components of the video processor 111.

In one embodiment, the cache 1120 is implemented as read-only cache. In such an embodiment, writes from the DMA engine 401 would be processed directly into the frame buffer memory 205. Cache hits would be returned from the cache 1120 only upon reads from the DMA engine 401. This allows a simplification of the circuitry comprising the cache 1120. The simplification enables high-speed optimization of the circuitry of the cache 1120 (e.g., to reduce latency, improve throughput, etc.). It should be noted that in the case of a write hit in the cache 1120, the affected cache line will be invalidated.

In one embodiment, the cache 1120 is implemented as a pipelined cache. The cache lines stored within the cache 1120 are pipelined such that a number of outstanding read requests can be maintained "in-flight" without stalling the scalar execution unit 201 or the vector execution unit 202. Outstanding read requests are queued and stored until the data can be fetched from the frame buffer memory 205 and loaded into the cache 1120. Once loaded, the read requests are satisfied by returning the data from the cache 1120.

It should be noted that the cache lines returned by the cache 1120 to satisfy outstanding read requests a returned in-order. This refers to the fact that the order in which the read requests are received and stored within the request queue is the same as the order in which the cache lines are returned to the scalar execution unit 201 or the vector execution unit 202. It should further be noted that the cache 1120 has a number of pipeline stages.

Figure 12:
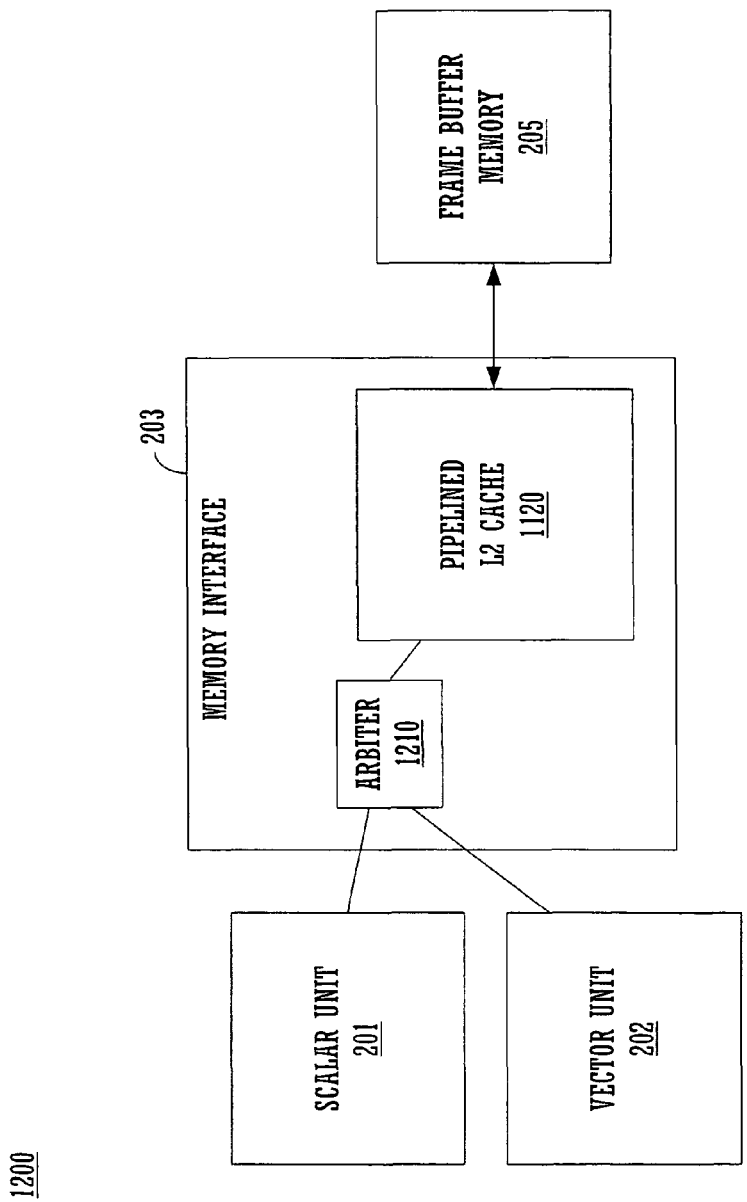
FIG. 12 shows a diagram showing an arbiter coupled to the cache for arbitrating read requests for the pipelined cache in accordance with one embodiment of the present invention.

FIG. 12 shows a diagram 1200 showing an arbiter 1210 coupled to the cache 1120 for arbitrating read requests for the cache 1120 in accordance with one embodiment of the present invention. As depicted in FIG. 12, the arbiter 1210 is shown couple to the scalar execution unit 201 and the vector execution unit 202.

The FIG. 12 embodiment shows the case where the cache 1120 is used to satisfy read requests from multiple functional components of the video processor 111. The FIG. 11 embodiment shows the pipelined cache 1120 providing frame buffer data to the DMA engine 401. The present FIG. 12 embodiment shows how the cache 1120 provides data to other components of the video processor 111, including the scalar execution unit 201 and the vector execution unit 202. The arbiter 1210 functions by arbitrating between simultaneous requests for data. A number of different arbitration schemes can be implemented in accordance with any particular requirements of a video processing application executing on the video processor 111.

Figure 13:
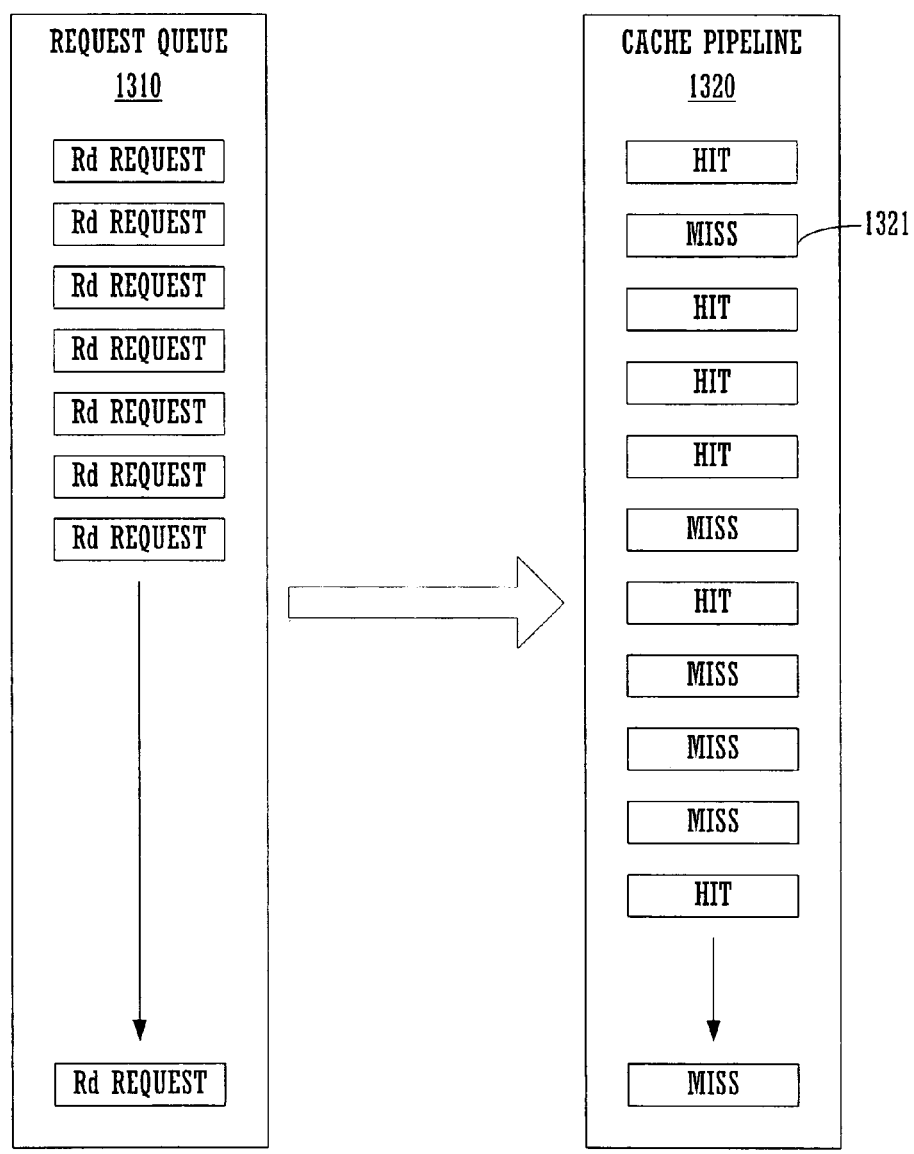
FIG. 13 shows a diagram illustrating the pipelined nature of the pipelined L2 cache and the manner in which outstanding requests are queued and cache lines corresponding to the outstanding requests are queued in accordance with one embodiment of the present invention.

FIG. 13 shows a diagram 1300 illustrating the pipelined nature of the cache 1120 and the manner in which outstanding requests are queued and cache lines corresponding to the outstanding requests are queued in accordance with one embodiment of the present invention.

The FIG. 13 embodiment illustrates the in-order property of the cache 1120. Diagram 1300 shows a request queue 1310 and a cache pipeline 1320. As described above, a number of outstanding read requests can be maintained in-flight. These read requests are stored within the request queue 1310 on a FIFO basis. Depending upon the state of the cache 1120, the read requests will either cause corresponding cache hits or corresponding cache misses.

In the present embodiment, a cache miss, as shown by the cache pipeline 1320, does not cause a stall of the scalar execution unit 201 or the vector execution unit 202. A cache miss causes a fetch of the missing data from the frame buffer 205. Meanwhile, read requests continue to be received as the video processor 111 continues to execute. These read requests are further added to the read request queue 1310 as shown in FIG. 13. Upon a cache miss, the cache pipeline 1320 allocates a cache line (e.g., an empty or unused cache line, a replacement cache line, or the like) for the data from the frame buffer 205 once it is fetched. Generally, as described in greater detail below, replacement cache lines are identified on a least recently used basis (e.g., LRU basis).

When the read request data arrives from the frame buffer 205, that data is placed within the allocated cache line (e.g., cache line 1321) and the cache line's status is changed from cache miss to cache hit (e.g., from invalid to valid). This process is repeated with each of the outstanding cache misses within the cache pipeline 1320, until eventually, within a set of cache lines of the cache pipeline 1320, all of the cache lines are valid. This set of cache lines is then output as a group to the requesting functional component. Generally, this set of cache lines is output to satisfy an outstanding work package allocated by one functional component (e.g., the scalar execution unit) of the video processor 111 to another functional component (e.g., the vector execution unit). Importantly, as described above, the cache lines comprising the set are output in-order, in the same order as their corresponding read requests were received in the request queue 1310.

In one embodiment, the number of stages of the cache pipeline 1320 and the request queue 1310 are related to the size of the work packages they typically return from the cache 1120 to the functional units of the video processor 111. Generally, in a preferred configuration, the larger the work packages, the deeper the pipelines of the request queue 1310 and the cache pipeline 1320 should be.

It should be noted that the multiple pipeline stages of the request queue 1310 and the cache pipeline 1320 are optimized to facilitate high-speed operation of the other components of the video processor 111. For example, as described above, the DMA engine 401 is required to execute high-level DMA commands by implementing numerous low-level DMA commands to format pixel data, implement different tile modes, and the like. The data pathways to the frame buffer memory 205 are optimized for very high speed. Because of this, requested data is stored into the cache 1120 and is then accessed from the cache 1120 by the DMA engine 401. This allows the DMA engine 401 to operate at its own pace, implementing its high-level DMA commands, and accessing requested data that is stored within the cache 1120, as opposed to tying up the high-speed data pathways to the frame buffer memory 205. This holds true in cases where the frame buffer memory 205 is implemented as a local graphics memory or as some portion of system memory of the host computer system.

Figure 14:
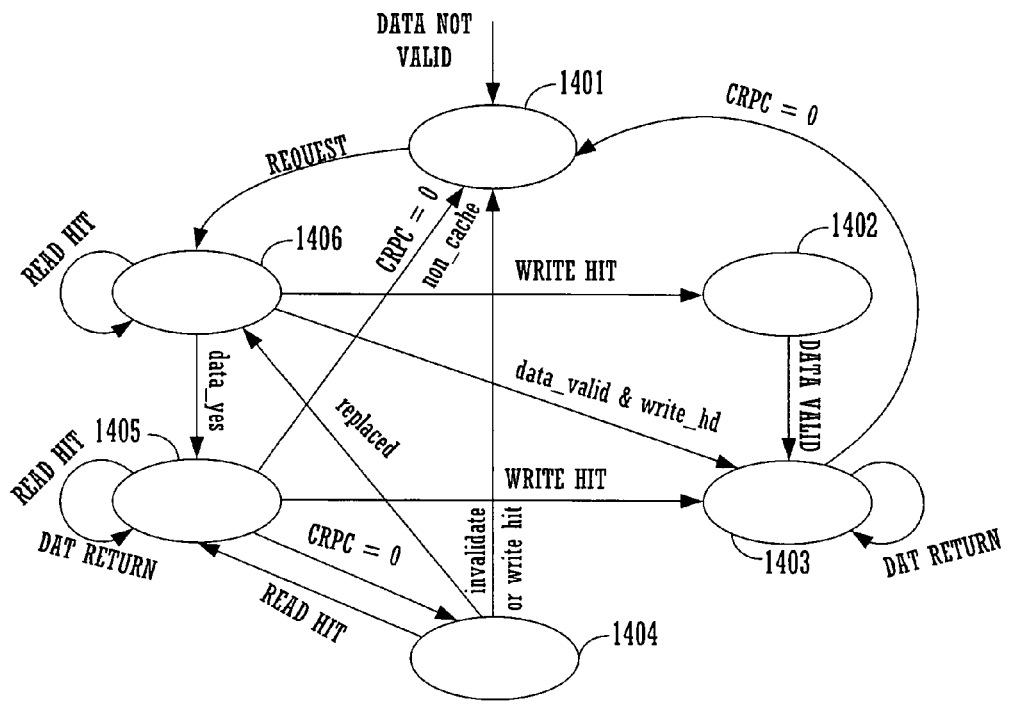
FIG. 14 shows a diagram of a state machine for operating a pipelined L2 cache in accordance with one embodiment of the present invention.

FIG. 14 shows a diagram of a state machine 1400 for operating a pipelined L2 cache in accordance with one embodiment of the present invention. As depicted in FIG. 14, the state machine 1400 illustrates 6 states (e.g., 1401-1406) used in operating the cache 1120. Actions undertaken in maintaining the cache 1120 and providing requested data to the video processor 111 are implemented by transitioning between the states 1401-1406 of the state machine 1400. As shown in FIG. 14, the conditions for transitioning between the states 1401-1406 are labeled along the lines indicating such transitions.

In the FIG. 14 embodiment, in general, the initial state of the state machine 1400 is state 1401, which is entered upon a cache miss (e.g., data not valid). State 1401 is exited upon a cache line request operation when the missing data is requested from the frame buffer memory 205 (e.g., line request). When the particular cache line continues to be hit (e.g., read hit), state 1406 is maintained. State 1406 is exited upon a "write hit" where the particular cache line is written to by one of the functional units of the video processor 111, for a transition to state 1402, upon a data valid and a write hit, for a transition to state 1403, and upon a data valid, for a transition to state 1405.

When the particular cache line continues to be hit (e.g., read hit) and the data is returned to the requesting functional unit, state 1405 is maintained. As shown in FIG. 14, a counter (e.g., CRPC counter) is used to indicate the number of times a particular cache line has been requested. For example, if the particular cache line has been requested three times, the CRPC (cache read pending count) counter will reflect this and will be decremented each time the cache line has been provided as a data return. When the CRPC counter has been decremented to zero, all requests for the cache line have been satisfied and state 1405 exits to state 1404. The same is true with state 1403, where state 1403 exits back to state 1401 upon the CPRC counter being decremented to zero. In state 1404, the particular cache line is no longer required, and state 1404 is exited upon an invalidation or a write hit back to state 1401, or upon replacement back to state 1406. Alternatively, the particular cache line can experience another read hit, in which case state 1404 exits back to state 1405.

Referring still to state machine 1400 of FIG. 14, it should be noted that at any clock, the state of more than one of the cache lines of a given set can change in one clock cycle. However, the state of only one of the cache lines can change from pending (e.g. invalid) to valid during the same clock cycle. If this happens, a variable used to track the most recently used and least recently used cache line changes to indicate its most recently used status.

In one embodiment, the least recently used variable can be implemented as an LRU counter. In such an embodiment, each cache line would have a corresponding LRU counter. Upon each cache line hit, the LRU counters for all cache lines, except the hit cache line, are incremented. In this manner, the highest LRU counter will generally indicate the least recently used cache line, and the LRU counter will also show the most recently used cache lines. In one embodiment, the LRU counter can be implemented as a 3 bit value stored and tracked for each cache line. All of the LRU counters are generally reset to zero upon initialization of the state machine 1400.

It should be noted that the number of gates required to implement the state machine 1400 is streamlined to minimize the amount of silicon die area that must be dedicated.

It should be noted that at times cache lines will have to be identified for replacement within the cache 1120 in order to make new room for new entries. Generally, the hardware will designate the first invalid cache line it detects as a replacement cache line. In those cases where there are no invalid cache lines, generally, the state machine 1400 will search all of the cache lines for the least recently used cache line to obtain replacement cache lines. In one embodiment, the state machine 1400 determines a replacement cache line by examining the LRU variables for each of the cache lines, and designates the least recently used cache line as the replacement cache line. New entries are then allocated to the replacement cache line (e.g., responsive to a cache miss).

It should be noted that in a case where there is a read request in flight to a given cache line and that cache line subsequently experiences a write hit, the cache line status is changed to dirty, but is not invalidated until the data from the in flight read request returns. Once this data returns, the cache line is invalidated. However, subsequent reads to the cache line after the write hit to the cache line but prior to the invalidation of the cache line will not produce a read hit. Additionally, it should be noted that an in flight read request issued in response to a miss for a cache line is tracked in order to avoid issuing a redundant read request. This allows the cache to support multiple in flight read requests without bogging down performance with numerous redundant read requests.

It should be noted that although the state machine 1400 has been described in the context of operating a pipelined L2 cache for a video processor, the state machine 1400 can be used to operate a number of different types of cache architectures for a number of different types of digital computer systems. Each of these digital computer systems will benefit from the efficient gate utilization of the state machine 1400 and the comparatively small amount of silicon die area that must be dedicated.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in-order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for using a pipelined L2 cache to implement memory transfers for a video processor, the method comprising:
   accessing a queue of read requests from a video processor, wherein the queue of read requests comprises a first set of read requests from a scalar execution unit within the video processor and a second set of read requests from a vector execution unit within the video processor;
   for each of the read requests, determining whether there is a cache line hit corresponding to the read request;
   for a cache line miss, allocating a cache line slot to store a new cache line responsive to the cache line miss;
   outputting an in-order set of valid cache lines to the video processor responsive to the queue of read requests, wherein the cache lines of the in-order set of valid cache lines are output together as a group in response to the set of cache lines becoming valid, and wherein the group comprises the in-order set of valid cache lines; and
   arbitrating between the first set of read requests and the second set of read requests by using an arbiter coupled to the pipelined L2 cache.

2. The method of claim 1, wherein the in-order set of cache lines are output to a DMA engine of the video processor.

3. The method of claim 1, further comprising:
   tracking an in flight read request issued in response to a miss for a cache line to avoid issuing a redundant read request.

4. The method of claim 1, wherein the group of in-order set of valid cache lines is output in response to a group of read requests.

5. The method of claim 1, wherein a frame buffer memory comprises a local graphics memory.

6. The method of claim 1, wherein the frame buffer memory comprises a system memory of a computer system.

7. The method of claim 1, wherein cache lines are replaced within the pipelined L2 cache on a least recently used basis.

8. The method of claim 1, wherein the in-order set of valid caches lines are output in an order that corresponding read requests were received by said queue of read requests.

9. A pipelined L2 cache for implementing frame buffer memory transfers for a video processor, comprising:

a read request queue for storing read requests from a video processor, wherein the read request queue is configured to receive a first set of read requests from a scalar execution unit within the video processor, and to receive a second set of read requests from a vector execution unit within the video processor; and a cache pipeline for storing cache lines for outputting an in-order set of valid cache lines to the video processor responsive to the read requests, the cache pipeline configured to determine, for each of the read requests, whether there is a cache line hit corresponding to the request, and configured to allocate, for a cache line miss, a cache line slot to store a new cache line responsive to the cache line miss, wherein the cache lines of the in-order set of valid cache lines are output together as a group in response to the set of cache lines becoming valid, and wherein the group comprises the in-order set of valid cache lines, and wherein an arbiter coupled to the pipelined L2 cache is configured to arbitrate between the first set of read requests and the second set of read requests.

10. The pipelined L2 cache of claim 9, wherein an in-order set of cache lines are output to a DMA engine of the video processor.

11. The pipelined L2 cache of claim 9, further comprising: tracking an in flight read request issued in response to a miss for a cache line to avoid issuing a redundant read request.

12. The pipelined L2 cache of claim 9, wherein the group of in-order set of valid cache lines is output in response to a group of read requests.

13. The pipelined L2 cache of claim 9, wherein a frame buffer memory comprises a local graphics memory.

14. The pipelined L2 cache of claim 9, wherein the frame buffer memory comprises a system memory of a computer system.

15. The pipelined L2 cache of claim 9, wherein cache lines are replaced within the pipelined L2 cache on a least recently used basis.

16. A system for executing video processing operations, comprising:
 a CPU;
 a video processor coupled to the CPU, comprising:
  a memory interface for implementing communication between the video processor and a frame buffer memory; and a pipelined L2 cache within the memory interface to implement memory transfers for the video processor, comprising:
   a read request queue for storing read requests from a video processor; and
   a cache pipeline for storing cache lines for outputting an in-order set of valid cache lines to the video processor responsive to the read requests, the cache pipeline configured to determine, for each of the read requests, whether there is a cache line hit corresponding to the request, and configured to allocate, for a cache line miss, a cache line slot to store a new cache line responsive to the cache line miss, wherein the cache lines of the in-order set of valid cache lines are output together as a group in response to the set of cache lines becoming valid, wherein the group comprises the in-order set of valid cache lines, wherein the read request queue is configured to receive a first set of read requests from a scalar execution unit within the video processor, and to receive a second set of read requests from a vector execution unit within the video processor, and wherein an arbiter coupled to the pipelined L2 cache is configured to arbitrate between the first set of read requests and the second set of read requests.

17. The system of claim 16, wherein the in-order set of cache lines are output to a DMA engine of the video processor.

18. The pipelined L2 cache of claim 16, wherein the pipelined L2 cache is a non-stalling pipelined L2 cache.

19. The system of claim 16, and wherein the group of in-order set of valid cache lines is output in response to a group of read requests.

20. The system of claim 16, wherein the frame buffer memory comprises a local graphics memory.

21. The system of claim 16, wherein the frame buffer memory comprises a system memory of a computer system.

22. The system of claim 16, wherein the in-order set of caches lines is output to satisfy an outstanding work package.

23. The system of claim 16, wherein the pipeline L2 cache comprises a plurality of stages related to the size of a plurality of work packages.

* * * * *